(12) United States Patent
Kim

(10) Patent No.: US 6,320,668 B1
(45) Date of Patent: Nov. 20, 2001

(54) COLOR CORRECTION APPARATUS AND METHOD IN AN IMAGE SYSTEM

(75) Inventor: Eun-Jin Kim, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/114,305

(22) Filed: Jul. 10, 1998

(30) Foreign Application Priority Data

Jul. 10, 1997 (KR) ................................................. 97-31875

(51) Int. Cl.$^7$ ...................................................... B41B 13/08
(52) U.S. Cl. ............................. 358/1.1; 358/504; 358/518
(58) Field of Search .................................. 358/504, 515, 358/518, 521, 522, 523, 535, 534, 429, 455, 1.1

(56) References Cited

U.S. PATENT DOCUMENTS

| | | | |
|---|---|---|---|
| 4,446,470 | * | 5/1984 | Sugiyama et al. ............... 346/104 R |
| 5,339,176 | * | 8/1994 | Smilansky et al. .................. 358/504 |
| 5,363,318 | * | 11/1994 | McCauley ........................ 364/571.01 |
| 5,581,376 | * | 12/1996 | Harrington ............................ 358/518 |
| 5,881,211 | * | 3/1999 | Matsumura ........................... 395/109 |
| 6,043,909 | * | 3/2000 | Holub ................................... 358/504 |

FOREIGN PATENT DOCUMENTS

403069272A * 3/1991 (JP) ................................ H04N/1/46

* cited by examiner

Primary Examiner—David Moore
Assistant Examiner—K C Kianni
(74) Attorney, Agent, or Firm—Robert E. Bushnell, Esq.

(57) ABSTRACT

A color correction apparatus and method thereof in an image system are capable of automatically processing color correction by storing reference colorimetric data regarding a predetermined test pattern for estimating the color correction in a storage medium, and then scanning the estimating test pattern so that the color correction can be performed by minimizing an error between the reference data and the scanning data obtained by scanning the test pattern. As a result, color correction can be performed without using an optical densitometer or a colorimeter, and the operation for correcting the color can be performed without knowledge of the color coordinate system or the color signal.

19 Claims, 15 Drawing Sheets

| 0.D 0.0 | 0.D 0.1 | 0.D 0.2 | 0.D 0.3 | 0.D 0.4 | 0.D 0.5 | 0.D 0.6 | 0.D 0.7 | 0.D 0.8 | 0.D 0.9 | 0.D 1.0 | 0.D 1.1 |
|---|---|---|---|---|---|---|---|---|---|---|---|

| Dark skin | Light skin | Blue sky | Foliage | Blue flower | Bluish green |
|---|---|---|---|---|---|
| Orange | Purplish blue | Moderate red | Purple | Yellow green | Orange yellow |
| Blue | Green | Red | Magenta | Cyan | Yellow |
| White | Neutral 8 | Neutral 6.5 | Neutral 5 | Neutral 3.5 | Black |

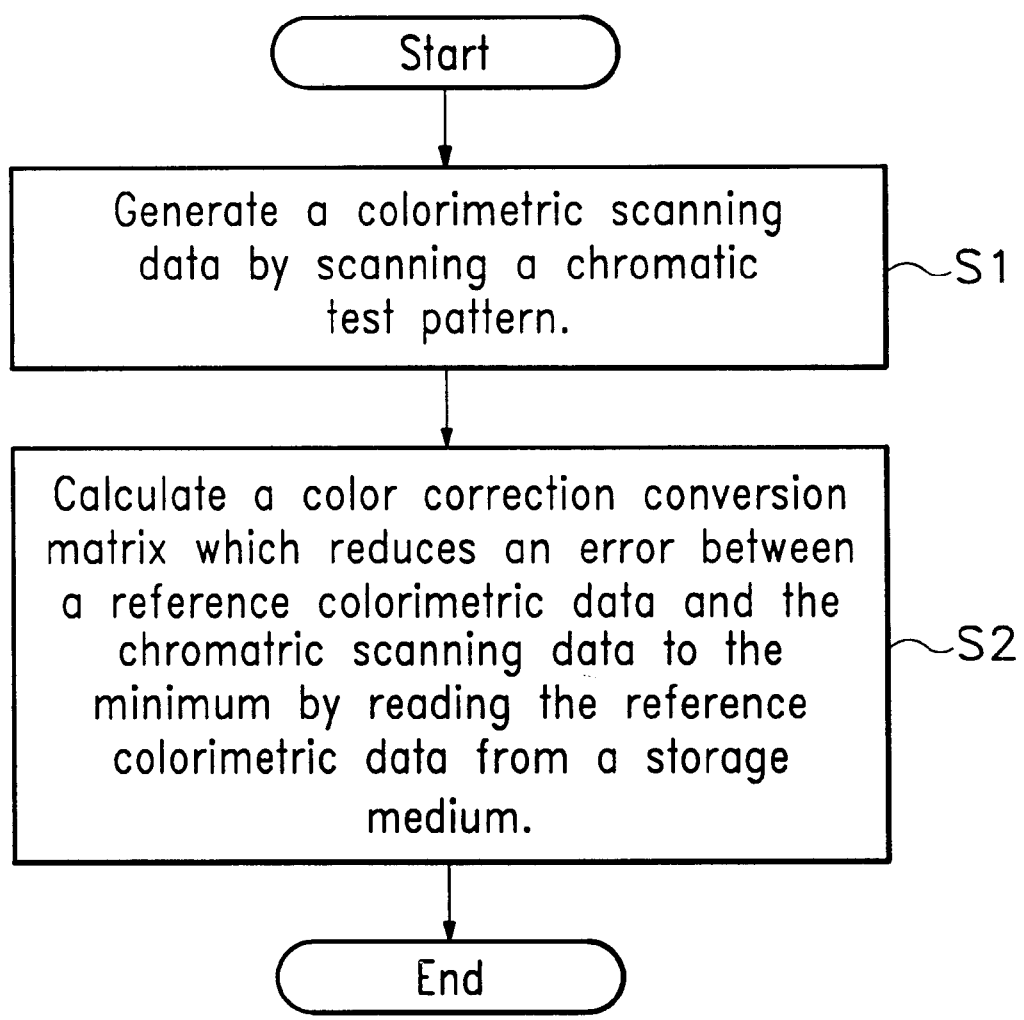

COLOR CORRECTION APPARATUS AND METHOD IN AN IMAGE SYSTEM

CLAIM OF PRIORITY

This application makes reference to, incorporates the same herein, and claims all benefits accruing under 35 U.S.C. §119 from an application for COLOR CORRECTION APPARATUS AND METHOD IN AN IMAGE SYSTEM earlier filed in the Korean Industrial Property Office on the $10^{th}$ of July 1997 and there duly assigned Serial No. 31875/1997.

BACKGROUND OF THE INVENTION

1. Technical Field

The present invention relates to a color correction apparatus and method thereof in an image system and, more particularly, to a color correction apparatus and method thereof in an image system capable of automatically processing the color correction by storing reference colorimetric data regarding a predetermined test pattern for estimating the color correction in a storage medium, and then scanning the test pattern so that the color correction can be performed by minimizing an error between the reference data and the scanning data obtained by scanning the test pattern.

2. Related Art

Conventionally, an image system is a system which acquires, processes, outputs, converts, transmits, improves, etc. image signals in compliance with an aim. As examples of the image system, a printer and a scanner are publicly well known and widely used. In addition, a multifunctional machine which integrates the printer and scanner functions, and which performs a document output function is a good example of an image system.

Such multi-functional machines include a scanner which, after radiating and illuminating light having a certain spectrum toward an object such as a document, performs photoelectric conversion which converts optical information reflected from the object into an electrical signal, thereby acquiring image information. A printer is also an essential component part in multi-functional machines, and the recent development of color printers has led to the printing of multicolor images by the use of plural toners or plural ink cartridges. As the supply color printer has increased, high quality or high definition printing has become prevalent in color printing. The color image is obtained through a color resolution process which employs color reproduction characteristics of a color image obtained from a spectral optical system.

As discussed in more detail below, waveforms illustrating the visual characteristic of the human optical system and the spectral characteristic of an image system are important in obtaining color reproduction in modern image systems. Moreover, a color correction process is performed by allowing the visual characteristic of the human optical system to be aligned with or to correspond to the spectral characteristic of the image system. Such a color correction process is typically performed by mathematical operations which are very complicated. As also discussed in more detail below, three methods are employed: a linear transformation method; a polynomial transformation method; and a three-dimensional look-up table method. Of these three methods, certain methods are more accurate than others, and certain other methods are more costly than others. Thus, a particular method must be chosen based on the objective to be achieved, for example, cost or accuracy.

Through a use of a color correction apparatus and method in an image system, color correction is to a certain degree accomplished by correcting the spectrum characteristic of the spectral optical system and the individual variation in light quantity. However, the apparatus and method cannot properly cope with the age-based variation generated by the operating conditions or the environmental differences when performing color correction.

In addition, in an image system, the color image input unit is attached to other image devices having different color reproduction characteristics (such as a monitor, printer or a communication device). Since the color reproduction characteristics of each image device are different, technology capable of performing a device-independent color correction procedure is needed.

Therefore, there is a need for the development of a color correction method and apparatus which adaptively performs color correction according to a spectrum characteristic of a spectral optical system, age-based variation and individual variation in light quantity. That is, there is a need for the development of a color correction method and apparatus which performs color correction without regard to the spectrum characteristic of the spectral optical system, age-based variation, and individual variation in the light quantity.

There is also a need for the development of a color correction method and apparatus which is capable of performing gray level correction prior to performing color correction in order to acquire linearity of gray level characteristics regarding each spectrum of the primary colors (red, green and blue).

SUMMARY OF THE INVENTION

Therefore, it is an object of the present invention to perform color correction adaptively according to a spectrum characteristic of a spectral optical system, age-based variation and individual variation in the light quantity in order to perform color correction without regard to the spectrum characteristic of the spectral optical system, age-based variation and individual variation in the light quantity. Color correction is performed in order that the spectrum characteristic have a linear relation to the visual characteristic of a human being. Preset reference colorimetric data regarding a test pattern for measuring the color correction is stored in a storage medium, and the color correction process is performed in order to reduce an error between scanning data obtained by scanning the measuring test pattern and reference colorimetric data to a minimum, thereby scanning a prescribed measuring test pattern document. As a result, the color correction process is automatically performed.

It is another object of the present invention to provide a color correction apparatus and method thereof in an image system capable of performing gray level correction prior to performing color correction in order to acquire the linearity of gray level characteristics regarding each spectrum of RGB colors.

According to one aspect of the present invention, the color correction apparatus of the image system, which includes a photoelectric conversion unit which radiates an illuminating light having a certain light emitting spectrum to an object and which outputs the spectral information regarding the RGB colors reflected from the object after converting it into electrical signals, includes: a reference data storage unit which stores reference gray level data and reference colorimetric data measured from an achromatic test pattern and a chromatic test pattern of a preset test pattern, respectively, by accumulating the data in the database system; a correction coefficient calculating unit, including a color correction coefficient calculating unit which calculates a color correction coefficient matrix, for reducing an error between colorimetric scanning data and the reference colorimetric data to a minimum according to a certain color correction method after receiving the colorimetric scanning data obtained by scanning the chromatic test pattern through the photoelectric conversion unit; and a color correction unit, including a color correction processing unit which receives the color correction coefficient matrix from the correction coefficient calculating unit, for performing a linear transformation applying the color correction coefficient matrix to an output of the photoelectric conversion unit, and then for outputting the result after converting into a certain color coordinate system.

Preferably, the correction coefficient calculating unit further includes a gray level correction coefficient calculating unit for calculating a gray level correction coefficient matrix which reduces an error between gray level scanning data and the reference gray level data to a minimum after receiving the gray level scanning data obtained by scanning the achromatic test pattern through the photoelectric conversion unit.

Preferably, the color correction unit further includes a gray level correction processing unit which receives the color correction coefficient matrix from the gray level correction coefficient calculating unit, performs a linear transformation applying the gray level correction coefficient matrix to the output of the photoelectric conversion unit and then applies the outputs to the color correction processing unit.

Preferably, the reference data storage unit includes: a reference gray level data storage unit which stores the reference gray level data measured by an optical densitometer from the achromatic test pattern of the test pattern by accumulating the data in the database system; and a reference colorimetric data storage unit which stores the reference colorimetric data measured through the colorimeter from the chromatic test pattern of the test pattern by accumulating the data in the database system.

Preferably, the correction coefficient calculating unit further includes a color correction conversion matrix calculating unit which calculates a color correction conversion matrix through matrix multiplication in the order of the gray level correction coefficient matrix and color correction coefficient matrix. Preferably, the color correction unit performs a linear transformation by applying the color correction conversion matrix to the output of the photoelectric conversion unit, and then outputs the output of the photoelectric conversion unit after converting it into a certain color coordinate system.

According to another aspect of the present invention, a color correction method of an image system, which performs a color correction process through a linear transformation by applying a color correction conversion matrix to input data obtained by scanning an input target document, includes the steps of: generating first scanning data of a first gray level scanning data and a first colorimetric scanning data by scanning an achromatic test pattern and a chromatic test pattern of a preset test pattern, respectively; calculating a first gray level correction coefficient for calculating a first gray level correction coefficient matrix which reduces an error between reference gray level data and the first gray level scanning data to a minimum by reading the reference gray level data from a storage medium which stores the reference gray data previously measured from the achromatic test pattern; performing a first gray level correction for acquiring a linearity of gray level characteristics regarding each color by generating first gray level correction colorimetric data through a linear transformation by applying the first gray level correction coefficient matrix to the first colorimetric scanning data; calculating a first color correction coefficient for calculating a first correction coefficient matrix which reduces an error between reference colorimetric data and the first gray level correction colorimetric data to a minimum according to a certain color correction method by reading the reference colorimetric data from the storage medium which stores the reference colorimetric data previously measured from the chromatic test pattern; and calculating a first color correction conversion matrix through matrix multiplication in the order of the first gray level correction coefficient matrix and the first color correction coefficient matrix, and setting the first color correction conversion matrix as the color correction conversion matrix.

The color correction of the image system further includes the steps of: generating an output test pattern including an achromatic output pattern and a chromatic output pattern by outputting first color correction data generated by linear transformation applying the first color correction conversion matrix to the first gray level scanning data and first colorimetric scanning data through a color image output unit; generating second scanning data of second gray level scanning data and second colorimetric scanning data by scanning the achromatic output pattern and chromatic output pattern included in the output test pattern, respectively; calculating a second gray level correction coefficient calculating coefficient for calculating a second gray level correction coefficient calculating matrix which reduces an error between the reference gray level data and the second gray level scanning data to a minimum by reading the reference gray level data from the storage medium which stores the reference gray level data; performing a second gray level correction for acquiring the linearity of gray level characteristics regarding each color by generating a second gray level correction colorimetric data through linear transformation applying the second gray level correction coefficient matrix to the second colorimetric scanning data; calculating a second color correction coefficient for calculating a second color correction coefficient matrix which reduces an error between the reference colorimetric data and the second gray level correction colorimetric data to a minimum according to a certain color correction method by reading the reference colorimetric data from the storage medium which stores the reference colorimetric data; and calculating a second color correction conversion matrix through the matrix multiplication in the order of the second color correction coefficient matrix, second gray level correction coefficient matrix and the first color correction conversion matrix, and setting the second color correction conversion matrix as the color correction conversion matrix.

According to another aspect of the present invention, a color correction method of an image system which performs a color correction process through linear transformation applying a color correction conversion matrix to input data obtained by scanning an input target document includes the steps of: generating an output test pattern including an achromatic output pattern and a chromatic output pattern by reading reference gray level data and reference colorimetric data previously measured from an achromatic test pattern and a chromatic test pattern of a preset test pattern, respectively, from a storage medium, and outputting the reference gray level data and reference colorimetric data through a color image output unit; generating scanning data of gray level scanning data and colorimetric scanning data by scanning the achromatic output pattern and chromatic output pattern included in the output test pattern, respectively, through a color image input unit; calculating a gray level correction coefficient for calculating a gray level correction coefficient matrix which reduces an error between the reference gray level data and the gray level scanning data to a minimum by reading the reference gray level data from the storage medium which stores the reference gray level data; performing gray level correction for acquiring a linearity of gray level characteristics regarding each color by generating gray level correction colorimetric data through the linear transformation applying the gray level correction coefficient matrix to the colorimetric scanning data; calculating a color correction coefficient for calculating a color correction coefficient matrix which reduces an error between the reference colorimetric data and the gray level correction colorimetric data to a minimum according to a certain color correction method by reading the reference colorimetric data from the storage medium which stores the reference colorimetric data; and calculating a color correction conversion matrix through a matrix multiplication in the order of the color correction coefficient matrix and gray level correction coefficient matrix.

Preferably, the test pattern includes an achromatic test pattern on which an achromatic color is divided equally at certain positions according to optical density; and a chromatic test pattern using a Macbeth color rendition chart on which a plurality of chromatic colors are divided equally at other positions.

Preferably, the certain color correction method is one of a linear transformation method, a polynomial transformation method, and a 3-dimensional look-up table method.

Preferably, the certain color coordinate system is an XYZ color coordinate system of the Commission International de l'Eclairage (CIE), which is one of the device independent color coordinate systems.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein;

FIG. 9 is a flowchart illustrating an embodiment of a color correction method of the image system according to the present invention;

DETAILED DESCRIPTION OF THE PREFERRED EMBODIMENTS

The objects, characteristics and advantages of the above-described invention will be more clearly understood through the preferable embodiments referring to the attached drawings.

A color correction apparatus and method thereof in an image system according to the present invention are explained with reference to the attached drawings.

Figure 1:
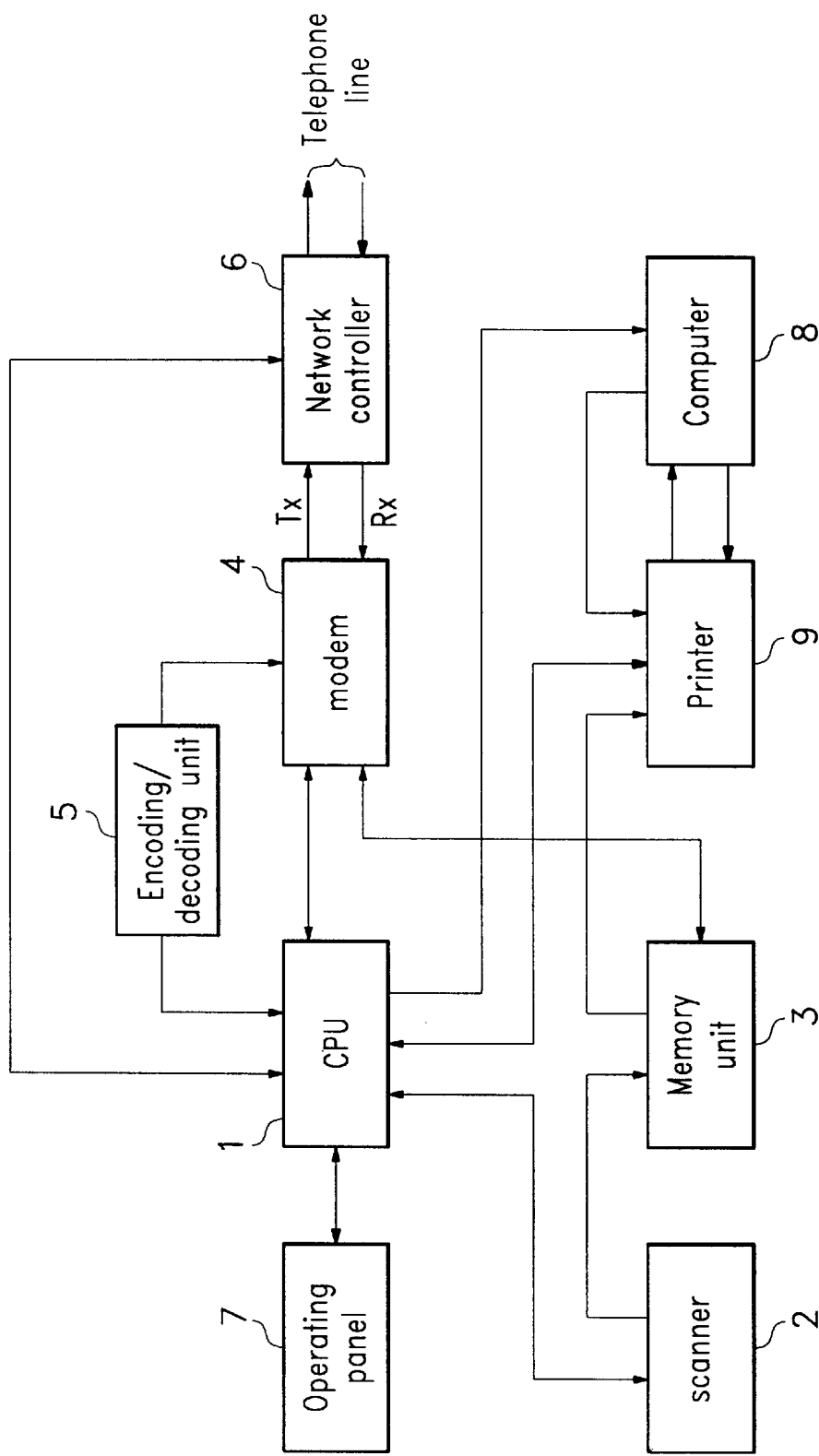
FIG. 1 is a schematic block diagram of a multifunctional machine.

FIG. 1 is a schematic block diagram of a multifunctional machine.

As shown in the drawing, the multifunctional machine includes: a central processing unit (CPU) 1 which controls and processes data according to a certain program; a scanner 2 which transmits digital image data to the CPU 1 by converting figures or characters of a document to be transmitted into electrical signals according to their optical characteristic; a memory unit 3 which stores program data, protocol data, character data and recorded audio data, and accesses or stores the data according to the CPU 1; a modem 4 which modulates data outputted from the CPU 1 to an analog format, which demodulates a received input signal, and which then outputs them under the control of the CPU 1; encoding/decoding unit 5 which encodes or decodes the data under the control of the CPU 1 for efficiently processing the data inputted/outputted to/from the modem 4; a network controller 6 which forms a communication loop of a telephone line, and which interfaces a signal of the modem 4 and a signal of the telephone line under the control of the CPU 1; an operating panel 7 which inputs various kinds of commands via a plurality of keys and which has a display device for displaying states and various information under the control of the CPU 1; a computer 8 which has a main memory and an auxiliary memory; and a printer 9 which prints the original information through an optional transmission line or prints the data stored in computer 8.

The scanner 2, which is a typical color image input unit, is the most common means for scanning printed data, photographs, figures or characters formed manually, and it is an essential component part in a multifunctional machine, a document translating machine, a computer for computer aided design (CAD), a facsimile, and a character recognition machine.

After radiating an illuminating light having a certain light-emitting spectrum to an object (e.g., document), the scanner 2 performs photoelectric conversion which converts optical information which is reflected from the object into an electrical signal in a photoelectric conversion device, such as a charge coupled device (CCD), thereby acquiring the image information.

In addition, the printer 9 is a typical image output device, and is a device for recognizing and storing the data which is processed by the computer, and for outputting the data into a document format. It is an essential component part in the multifunctional machine, personal computer (PC), facsimile, electronic cash register, and cash dispenser. Until now, a daisy wheel printer, pin printer, ink jet printer, and a laser printer have been developed. The ink jet printer and laser printer are especially used in the present day.

Due to the development of color printers, such as the color laser printer, the color ink jet printer and other devices equipped with printers as essential component parts, printing of a document including color image data and characters has gradually become widespread. Multicolor images can be printed on a printable medium by use of a plurality of toners in the case of the color laser printer, and a plurality of ink cartridges in the case of the color ink jet printer. The color printer realizes multicolors through a YMCK (Yellow, Magenta Cyan blacK) method. In other words, by using toner or ink having four colors of yellow, magenta, cyan and black, multicolors can be realized.

As the supply of color printers has increased, high quality or high definition printing has become prevalent as in the case of black and white printing.

The color image of the image system can be obtained through a color resolution process which extracts the size of the optical information over a spectrum band having three (3) waves of red, green and blue from a multicolored visible image.

A color reproduction characteristic of the color image is decided according to whether the color resolution characteristic maintains a linear relation to the optical system of human being. At this time, when the spectrum characteristic (i.e., energy ratio per three waves) and the size of the absolute light quantity maintain a linear relation to the visual characteristic of the optical system of the human without regard to an operational condition, a good color reproduction characteristic can be obtained.

A spectral optical system comprised of a illuminating light, an image sensor and a color resolution filter has a individual variation in which a minute difference between the characteristics is generated. Moreover, the spectral optical system has an age-based variation in which the characteristics are changed based on time, according to variation in operating conditions such as operating temperature. Since these variations cause the linear color reproduction characteristic to be distorted, it is necessary to properly control the spectrum characteristic, individual variation and aged-based variation of the light quantity in order to maintain a good color reproduction characteristic.

There are so many related arts which adapt a device to maintain a proper color temperature by controlling the electrical operating conditions, such as current and voltage of the illuminating light, by controlling the spectrum characteristic and light quantity, and by use of means for increasing an electrical output signal of a sensor for controlling the individual variation of the image sensor.

However, in order that the operating condition of the spectral optical system comprised of the illuminating light, image sensor and the color resolution filter be maintained in a linear relation relative to the visual characteristic of the optical system of the human being, it is not enough to control each of the component parts individually. That is, it is necessary to control the spectrum characteristic over the entire system.

In compliance with those necessities, there are a plurality of related arts disclosing a color correction apparatus and method in an image system which correct the spectrum characteristic of the spectral optical system and the individual variation in the light quantity.

Figure 2:
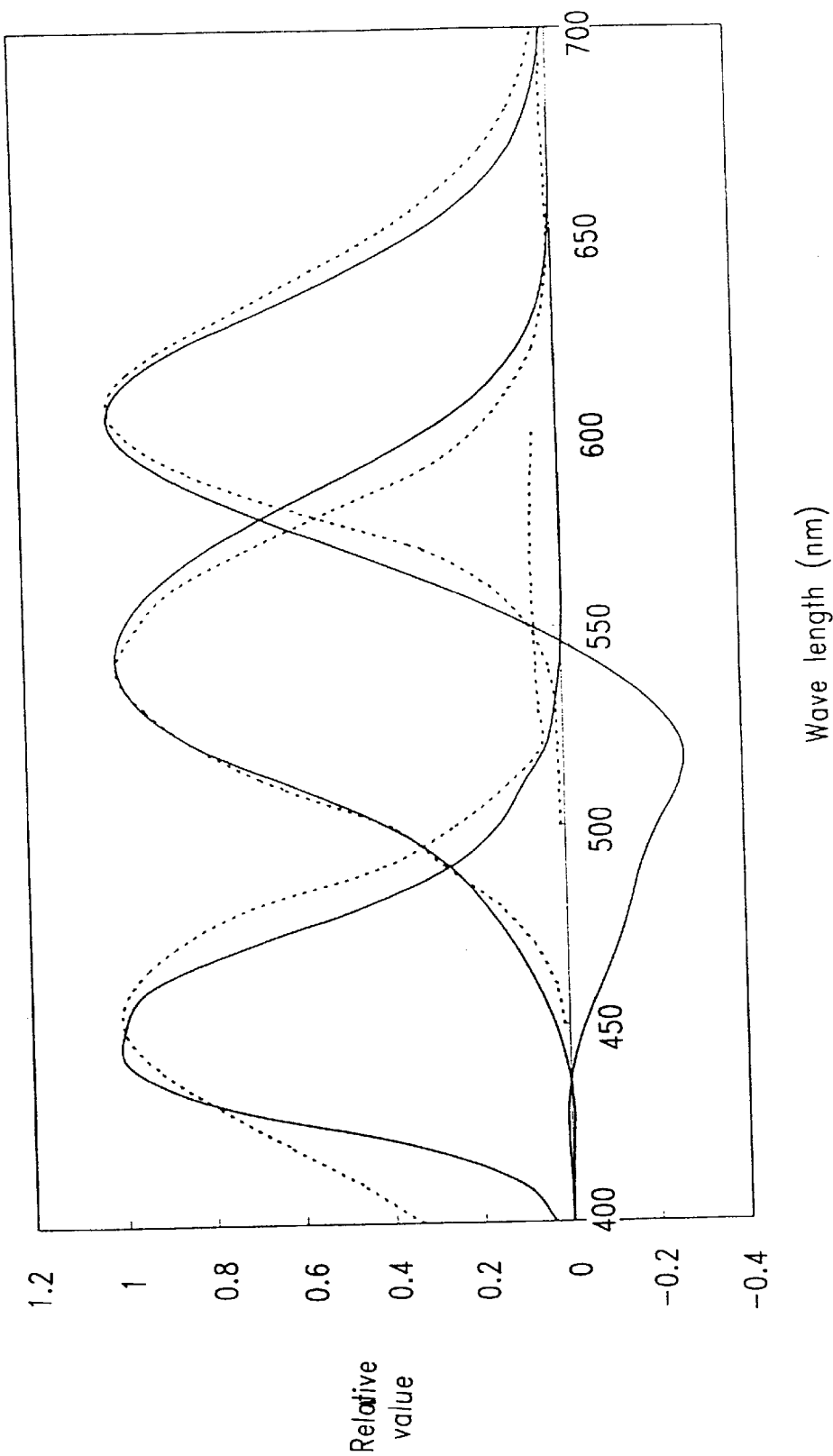
FIG. 2 is a waveform illustrating a visual characteristic of a human optical system and a spectral spectrum characteristic of an image system.

FIG. 2 is a waveform illustrating the visual characteristic of the human optical system and the spectral spectrum characteristic of the image system. Here, the waveform formed in a dotted line indicates the spectral spectrum characteristic of the image system. The waveform formed in a solid line indicates the visibility of a reference observer according to the prescription of the Commission International de l'Eclairage (CIE).

Referring to FIG. 2, the color correction process is performed by allowing the visual characteristic of the human optical system, indicated by a solid line, to be aligned with or to correspond to the spectral spectrum characteristic of the image system indicated by a dotted line.

The color correction process is performed through mathematical operations which are very complicated. It is necessary to acquire the user's convenience. The color correction process is divided into three methods according to the method for setting the correlation between the visual characteristic of the human optical system and the spectral spectrum characteristic of the image system: a linear transformation method; a polynomial transformation method; and a 3-dimensional look-up table method.

First, the linear transformation method is explained. Assuming that the wavelength is $\lambda$, the spectrum characteristic of the reflected color is $C(\lambda)$, the color resolution filters of red, green and blue colors of the image input system are $f_R(\lambda)$, $f_G(\lambda)$ and $f_B(\lambda)$, respectively, and outputs $S_R$, $S_G$ and $S_B$ of the image sensors of red, green and blue colors are as follows:

$$S_R = \int C(\lambda) f_R(\lambda) d\lambda$$

$$S_G = \int C(\lambda) f_G(\lambda) d\lambda$$

$$S_B = \int C(\lambda) f_B(\lambda) d\lambda \qquad (1)$$

Here, the integrating range has a wave bandwidth of 380 mn to 780 mn, which is the range of the visible light. Assuming that the characteristics of the color resolution filters of red, green and blue colors to be $I_R(\lambda)$, $I_G(\lambda)$ and $I_B(\lambda)$, outputs of the image sensors of ideal red, green and blue colors $P_R$, $P_G$ and $P_B$ are as follows:

$$P_R = \int C(\lambda) I_R(\lambda) d\lambda$$

$$P_G = \int C(\lambda) I_G(\lambda) d\lambda$$

$$P_B = \int C(\lambda) I_B(\lambda) d\lambda \qquad (2)$$

In formula (2), assuming that estimated values of $I_R(\lambda)$, $I_G(\lambda)$ and $I_B(\lambda)$ are $\hat{I}_R(\lambda)$, $\hat{I}_G(\lambda)$ and $\hat{I}_B(\lambda)$, the $\hat{I}_R(\lambda)$, $\hat{I}_G(\lambda)$ and $\hat{I}_B(\lambda)$ are indicated as follows.

$$\hat{I}_R = a_{11} f_R(\lambda) + a_{12} f_G(\lambda) + a_{13} f_B(\lambda)$$

$$\hat{I}_G = a_{21} f_R(\lambda) + a_{22} f_G(\lambda) + a_{23} f_B(\lambda)$$

$$\hat{I}_B = a_{31} f_R(\lambda) + a_{32} f_G(\lambda) + a_{33} f_B(\lambda) \qquad (3)$$

Here, $a_{11}$, $a_{12}$, $a_{13}$, $a_{21}$, $a_{22}$, $a_{23}$, $a_{31}$, $a_{32}$ and $a_{33}$ are real numbers, which are coefficients for reflecting gains of the relevant color resolution filters. At this time, outputs $P_R$, $P_G$ and $P_B$ of the estimated image sensors are indicated as follows.

$$P_R = a_{11}\int f_R(\lambda)C(\lambda) + a_{12}\int f_G(\lambda)C(\lambda) + a_{13}\int f_B(\lambda)C(\lambda)$$

$$P_G = a_{21}\int f_R(\lambda)C(\lambda) + a_{22}\int f_G(\lambda)C(\lambda) + a_{23}\int f_B(\lambda)C(\lambda)$$

$$P_B = a_{31}\int f_R(\lambda)C(\lambda) + a_{32}\int f_G(\lambda)C(\lambda) + a_{33}\int f_B(\lambda)C(\lambda) \quad (4)$$

Referring to formula (1), formula (4) can be expressed with a matrix as follows:

$$\begin{bmatrix} P_R \\ P_G \\ P_B \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} S_R \\ S_G \\ S_B \end{bmatrix} \quad (5)$$

The color correction based on the linear transformation method is performed using the formula (5).

Second, the polynomial transformation method is explained. This method is similar to the aforesaid linear transformation method in terms of performing the color correction by forming an optimum matrix. While the linear transformation method only uses the outputs $S_R$, $S_G$ and $S_B$ of the image sensors of red, green and blue colors, the polynomial transformation method uses the outputs $S_R$, $S_G$ and $S_B$, their square terms of $S_R^2$, $S_G^2$ and $S_B^2$, their multiplying terms of $S_R S_G$, $S_R S_B$ and $S_G S_B$, and their constant terms, thereby optimizing the 3×9 matrix. These are expressed in a matrix related formula.

$$\begin{bmatrix} P_R \\ P_G \\ P_B \end{bmatrix} = \begin{bmatrix} a_{11} & a_{12} & a_{13} & a_{14} & a_{15} & a_{16} & a_{17} & a_{18} & a_{19} \\ a_{21} & a_{22} & a_{23} & a_{24} & a_{25} & a_{26} & a_{27} & a_{28} & a_{29} \\ a_{31} & a_{32} & a_{33} & a_{34} & a_{35} & a_{36} & a_{37} & a_{38} & a_{39} \end{bmatrix} \begin{bmatrix} S_R \\ S_G \\ S_B \\ S_R^2 \\ S_G^2 \\ S_B^2 \\ S_R S_G \\ S_R S_B \\ S_G S_B \end{bmatrix} + \begin{bmatrix} k_1 \\ k_2 \\ k_3 \end{bmatrix} \quad (6)$$

Third, the 3-dimensional look-up table method is explained. It is a method of forming a look-up table by correlating the $P_R$, $P_G$ and $P_B$ to each of the $S_R$, $S_G$ and $S_B$ in the RGB color coordinate system. In the case that each of the R, G, B colors is quantized in an 8-bit expression, the size of the look-up table is $2^8 \times 2^8 \times 2^8$ (i.e., $2^{24}$), and thus a large amount of memory is required, and it takes much time to make up the look-up table. In order to solve the problem, the 3-dimensional RGB space is divided into small sized 3-dimensional spaces, and the look-up table is formed with respect to these points. Afterwards, regarding points which are included in the small sized 3-dimensional space and excluded from the look-up table, a method for analogizing an interpolation has been tried.

In terms of the accuracy of color correction, the superiority of the aforesaid three color correction methods is estimated in the order of the 3-dimensional look-up table method, polynomial transformation method and linear transformation method. In terms of the cost of realizing color correction, superiority is estimated in the order of the linear transformation method, polynomial transformation method and the 3-dimensional look-up table method. Accordingly, the selection of the color correction method can be decided according to the designing target and technological aim for the color correction environment.

Since color reproduction assumes the optical system of human beings and the visual characteristic is not accurately prescribed with a specific function, the 3-dimensional look-up table method, which maps the relation between an input mapping and the visual characteristic to 1:1 is the most essential approaching method. Conversely, the linear transformation method and polynomial transformation method, which are transformed by the matrix, performs color correction by connecting the input/output characteristic of the image system and the visual characteristic to the specific function. Since these two methods can simply perform color correction, they are widely used.

The accuracy of the linear transformation method and polynomial transformation method depends on the input/output characteristics of the image system and the linear transformation possibility to the color coordinate system to be corrected. Generally, when the RGB color coordinate system is mutually converted into the XYZ color coordinate system linearly, the linear transformation method can be used. However, when the RGB color coordinate system is converted into the YMCK (Yellow Magenta Cyan blacK) color coordinate system which is the typical color space in the field of printing used in a device using colors such as the printer or CIE L*a*b non-linearly, the polynomial transformation method or the 3-dimensional look-up table method is usually used.

In the mechanical aspect, 9 multipliers and 3 adders are required in the linear transformation method, and 27 multipliers and 27 adders are required in the polynomial transformation method. In the case of 3-dimensional look-up table method, when each of RGB colors is 8 bit, a storage space of $2^{16}$ byte is required.

For reference, CIE L*a*b is an equal perception space recommended by the CIE in 1976, which is the perception space having an even difference among the three reference colors. Its formal name is CIE1976L*a*b.

Hereinafter, a color specification system is explained for easier understanding.

The amount of the three primary colors which satisfies the matching color condition by the combination of the three primary colors can be defined, and this is called the color specification.

In 1931, in order to avoid the inconvenience of the RGB color coordinate system in which the value of red color is negative (−) in the wavelength of 440 to 545 nm, the CIE defined an XYZ color coordinate system having three primary colors of red having a wavelength of 700 nm, green having a wavelength of 546.1 nm and blue having a wavelength of 435.8 nm, respectively.

In other words, the XYZ color coordinate system of the CIE set new primary colors of X, Y, Z, removed the negative quantity, and then selected three primary colors so that a triangle formed by the new primary colors includes a spectrum color path in its inner part. Here, the three primary colors are virtual colors and the values of X, Y and Z are conventionally called "tri-stimuli".

Since each of the primary colors in the XYZ color coordinate system is virtual, it is set to satisfy the following conditions.

First, all colors can be matched by mixing a fixed quantity of the primary colors. That is, the triangle formed by the primary colors of X, Y and Z surrounds the spectrum. Second, the primary colors of X and Z are located on a plane of the RGB space having a luminance of zero. That is, only the primary color Y has the stimulus on the luminance, and the primary colors X and Z have only the colors and chroma.

In the latter regard, the conversion formula of the color coordinate system is as follows:

$$\begin{bmatrix} X \\ Y \\ Z \end{bmatrix} = \begin{bmatrix} 0.608 & 0.174 & 0.200 \\ 0.299 & 0.587 & 0.114 \\ 0.000 & 0.0662 & 1.112 \end{bmatrix} \begin{bmatrix} R \\ G \\ B \end{bmatrix} \quad (7)$$

Here, the formula Y=0.299R+0.587G+0.114B is a RGB signal, and it is the typical conversion formula used when combining to obtain the luminance signal Y.

Hereinafter, the color correction apparatus and method in an image system using a test pattern are explained.

After scanning the preset test pattern through an image input unit, color correction is performed by comparing with the naked eye an output test pattern outputted through an image output device with the preset test pattern, or by comparing the measured results of the test pattern and the output test pattern after measuring the patterns using a colorimeter.

In the case of color correction performed with the naked eye, since the color distortion characteristic generated by the image system is discriminated through the naked eye, the subjective element can be included in the determination, and there is a physical difficulty in finding the exact color distortion characteristic. Moreover, the operator who performs the color correction should have much knowledge about the color signal.

In the case of color correction performed by a colorimeter, there is an economic burden to prepare the costly colorimeter. Moreover, since automation cannot be achieved in a color correction process, it takes much time for the operator. Similarly, the operator who performs the color correction should have much knowledge about the color signal. Through use of a color correction apparatus and method in an image system, including a color correction apparatus and method using a test pattern, color corrections to a certain degree accomplished by correcting the spectrum characteristic of the spectral optical system and the individual variation in the light quantity. However, they cannot properly cope with the age-based variation which is generated by the operating condition or the environmental difference when performing color correction of the image system.

In addition, in the image system, the color image input unit is attached to other image devices having different color reproduction characteristics, such as a monitor, printer and a communication device, instead of being used separately. At this time, since the color reproduction characteristics of each image device are different, technology capable of performing device independent color correction is expected.

Prior to explaining the color correction apparatus and method thereof, an embodiment of a test pattern which is used for calculating a color correction conversion matrix in the present invention is explained for easier understanding.

Figure 3:
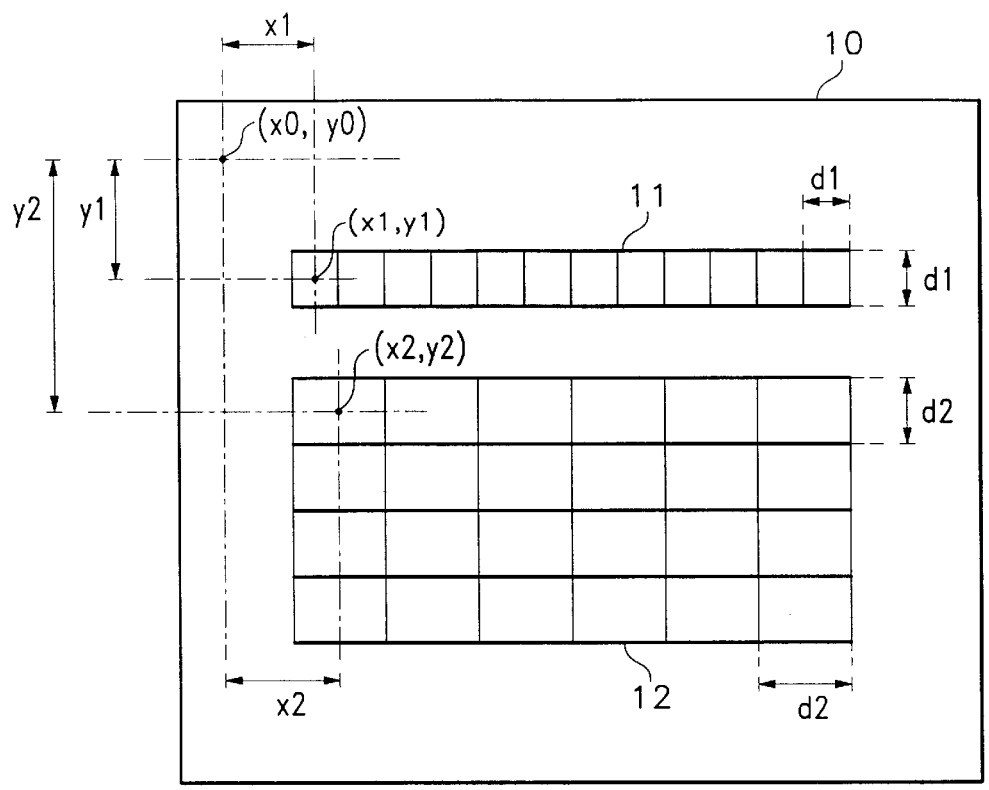
FIG. 3 is an illustrative view illustrating a test pattern used in a color correction apparatus and method thereof in an image system according to the present invention.

FIG. 3 is an illustrative view for explaining the test pattern used in the color correction apparatus and method thereof in the image system according to the present invention.

As shown in the drawing, the test pattern 10 includes: an achromatic test pattern 11 on which an achromatic color is evenly divided at predetermined positions according to optical density; and a chromatic test pattern 12 on which a plurality of chromatic colors are divided at another positions.

In other words, the test pattern 10 includes: the achromatic test pattern 11 on which the achromatic color which is gradually divided according to reflectance (i.e., the optical density) is evenly divided; and the chromatic test pattern 12 on which the chromatic colors such as red, green, blue, cyan, magenta, yellow, etc. are evenly divided.

In the test pattern 10, the achromatic test pattern 11 is for gray level correction, and the chromatic test pattern 12 is for color correction. As the number of colors increases, the correction becomes accurate, and it takes much time in processing to calculate a correction coefficient.

The geometrical arrangement of the test pattern 10 is important in accumulating a measuring data and scanning data for calculating the correction coefficient in a database system. At the achromatic test pattern 11, the chromatic color having optical density of OD 0.0 is located at position from (x0, y0), which is a reference starting point on a test pattern document, to (x1, y1). The achromatic color is horizontally equally divided, maintaining an interval of d1 in the width and length in the order of OD 0.1, OD 0.2, OD 0.3, OD 0.4, OD 0.5, OD 0.6, OD 0.7, OD 0.8, OD 0.9, OD 1.0 and OD 1.1.

In addition, the chromatic test pattern 12 comprises the chromatic colors equally divided in 4 rows and 6 columns. At positions from (x0, y0), which is the reference starting point, to (x2, y2), a dark skin of $1_{st}$ row and $1^{st}$ column is positioned. Next to the dark skin color of $1^{st}$ row, colors in the order of light skin, blue sky, foliage, blue flower and bluish green are positioned. In $2^{nd}$ row, colors in the order of orange, purplish blue, moderate red, purple, yellow green and orange yellow are positioned. In $3^{rd}$ row, colors in the order of blue, green, red, magenta, cyan and yellow are positioned. Lastly, in $4^{th}$ row, colors in the order of white, neutral 8, neutral 6.5, neutral 5, neutral 3.5 and black are positioned. All the colors have the width and length of d2 and are equally divided horizontally and vertically. Generally, as the chromatic colors, a Macbeth color rendition chart can be used.

There are several preconditions for performing the color correction of the present invention. The first precondition is to have the test pattern 10 include the aforesaid achromatic color and chromatic colors. The second precondition is to store reference gray level data which is an optical density value and reference colorimetric data which is a tri-stimuli value of an XYZ color coordinate system of CIE, each measured through an optical densitometer and a colorimeter from the achromatic test pattern 11 and the chromatic test pattern 12 of the test pattern, and stored in respective storage media by accumulating in a database system.

The XYZ color coordinate system of CIE (i.e., CIE-XYZ color coordinate system) is a color coordinate system which is the foundation of chromatics. As described above, the CIE-XYZ color coordinate system performs a coordinate conversion so that all color matching functions can have the positive (+) number, and supplies tri-stimuli which are new virtual three primary colors corresponding to the colors of RGB of the CIE. The reason for converting the RGB color coordinate system adopted by the color image input unit into the CIE-XYZ color coordinate system is that the CIE-XYZ color coordinate system supplies a device-independent color coordinate system.

Generally, in order to perform the colorimetric color correction, it is essential that the spectral characteristic of a color separation system of the color image input unit, such as a scanner, approximate the color matching function.

In other words, the colorimetric color correction is performed when a quality factor (QF) of a Neugebour of the system satisfying a Router condition approximates 1. Under that condition, after obtaining an approximate functional relationship between the RGB color coordinate system of the color image input unit and the CIE-XYZ color coordinate system, the approximate function is applied to the RGB color coordinate system of the color image input unit, thereby obtaining the device-independent CIE-XYZ color coordinate system.

The reference gray level data and reference colorimetric data are measured through the minute optical densitometer in order to obtain reliability. The optical density values of all the achromatic colors based on the achromatic test pattern 11 are measured through the optical densitometer and then accumulated in the database system. The tri-stimuli values of all the chromatic colors based on the chromatic test pattern 12 are measured through the colorimeter, and are then accumulated in the database system.

The color correction process of the image system including the present invention is performed through linear transformation by applying the color correction conversion matrix to the input data obtained by scanning the input target document. At this time, the accuracy of the color correction conversion matrix decides the performance of the color correction process, which allows linearity between the spectrum characteristic of the image system and the virtual characteristic of the human being.

The color correction process of the image system is roughly divided into: a color correction conversion matrix calculating process for calculating the color correction conversion matrix; and a color correction process for performing the actual color correction by applying the color correction conversion matrix to the input data obtained by scanning the input target document. The operation of the latter is a simply calculating operation which applies the color correction conversion matrix of the former to the input data. Accordingly, the operation of the former is very important in the technical aspect or operational aspect of the color correction technology. Conventionally, the color correction conversion matrix calculating process is performed when initializing the image system, or when users determine that color correction is to be newly performed according to the changed operating condition or environment, rather than performing the process whenever the input data is applied.

Hereinafter, one embodiment of the color correction apparatus of the image system according to the present invention is explained with reference to FIG. 4.

Figure 4:
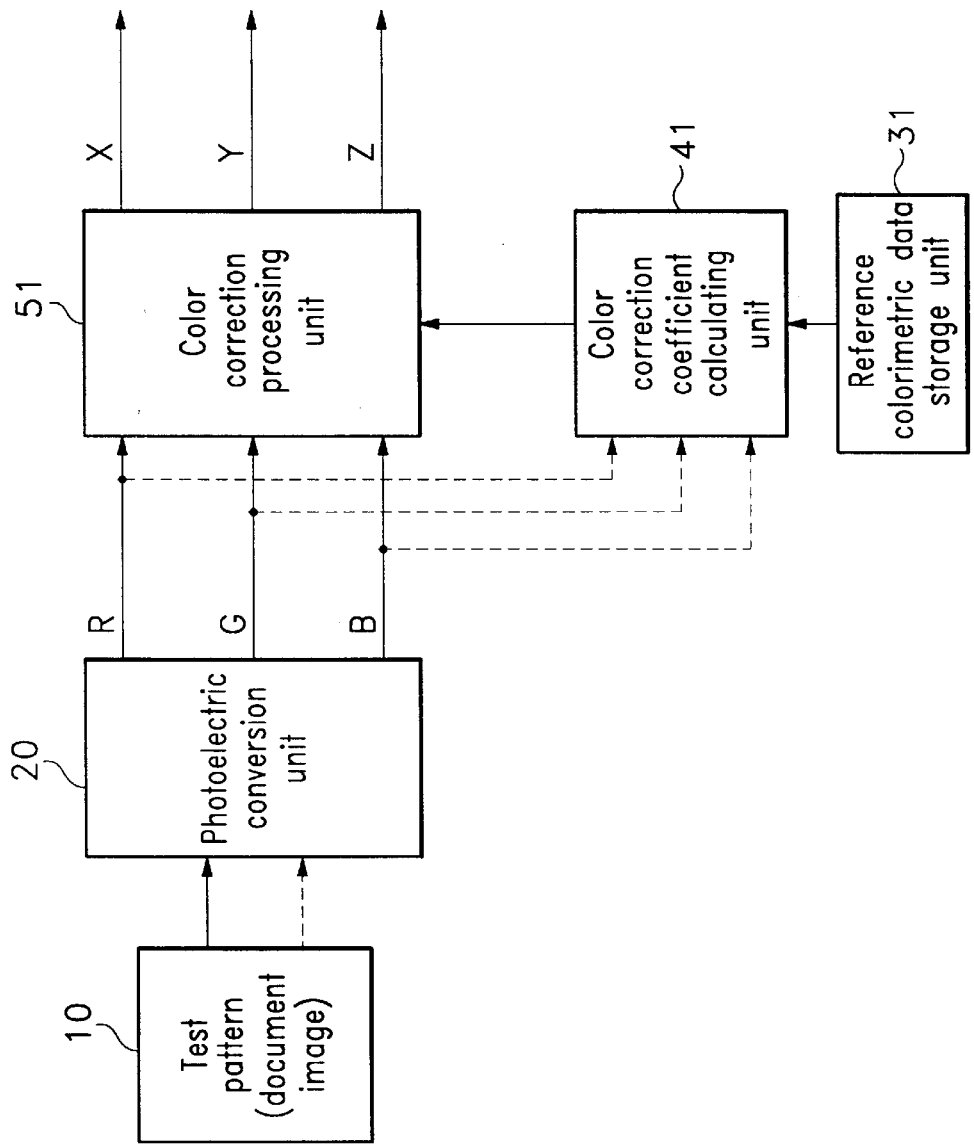
FIG. 4 is a block diagram illustrating an embodiment of a color correction apparatus of the image system according to the present invention.

FIG. 4 is a block diagram illustrating one embodiment of the color correction apparatus of the image system, which illustrates one example using a scanner, which is the typical color image input unit.

As shown in FIG. 4, according to one embodiment of the color correction apparatus of the image system, the color correction apparatus of the image system includes a photoelectric conversion unit 20 which radiates an illuminating light having a certain light emitting spectrum toward an object, and outputs the spectral information regarding the RGB colors reflected from the object after converting it into electrical signals. The apparatus also includes: a reference colorimetric data storage unit 31 which stores the reference colorimetric data measured from the chromatic test pattern 12 of the preset test pattern 10 by accumulating it in a database system; a color correction coefficient calculating unit 41 which calculates the color correction coefficient matrix which reduces an error between the colorimetric scanning data and reference colorimetric data to a minimum after receiving the colorimetric scanning data obtained by scanning the chromatic test pattern 12 through the photoelectric conversion unit 20; and a color correction processing unit 51 which receives the color correction coefficient from the color correction coefficient calculating unit 41, performs a linear transformation applying the color correction coefficient matrix to the output of the photoelectric conversion unit 20, and then outputs the result after converting it into a certain color coordinate system.

The operation of the embodiment of the color correction apparatus of the image system according to the present invention is explained referring to FIG. 4.

The operation of the one embodiment of the color correction apparatus is on the assumption that the test pattern 10, including the chromatic test pattern 12 comprising the chromatic colors, is provided, and that the reference gray level data, which is the optical density value measured through the optical densitometer from the chromatic test pattern 12 of the test pattern 10, is stored in the reference colorimetric data storage unit 31.

First, the photoelectric conversion unit 20 equipped with a charge-coupled device (CCD) as a photoelectric conversion element radiates the illuminating light having a certain light-emitting spectrum to the object. The photoelectric conversion unit 20 then converts the spectral information about each of the RGB colors reflected from the object into electrical signals, and outputs the signals.

The color correction coefficient calculating unit 41 calculates the color correction coefficient matrix which reduces the error between the colorimetric scanning data and reference colorimetric data to a minimum according to the certain color correction method after receiving the colorimetric scanning data obtained by scanning the chromatic test pattern 12 through the photoelectric conversion unit 20. At this time, the color correction method is performed through one of a linear transformation method, a polynomial transformation method, and a 3-dimensional look-up table method.

After that, the color correction processing unit 51 receives the color correction coefficient matrix from the color correction coefficient calculating unit 41, performs the linear transformation applying the color correction coefficient matrix to the output of the photoelectric conversion unit 20, and then outputs the result after converting it into a CIE-XYZ color coordinate system, which is a device-independent color coordinate system.

Hereinafter, a preferred embodiment of the color correction apparatus of the image system according to the present invention is explained with reference to FIG. 5.

Figure 5:
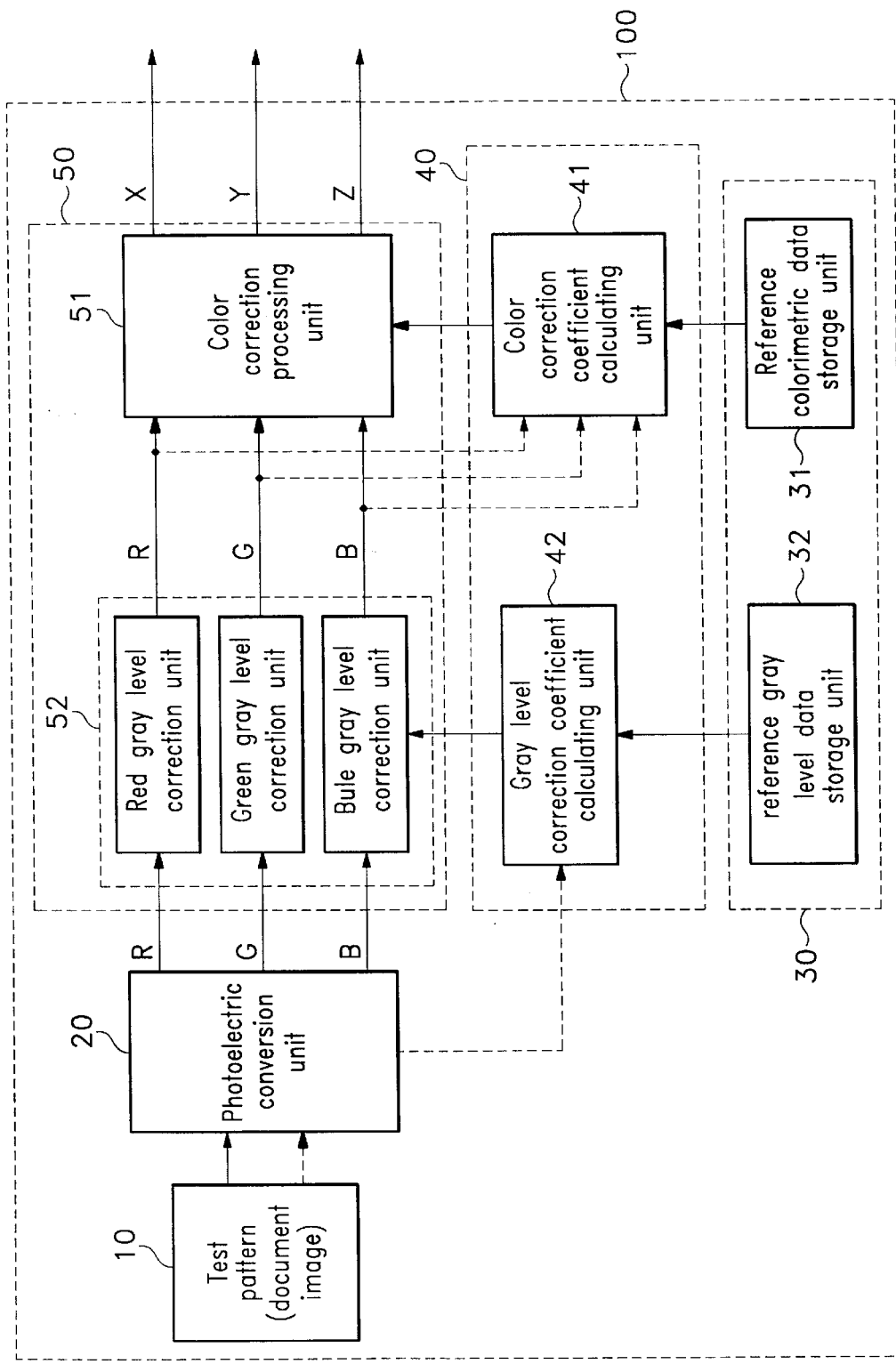
FIG. 5 is a schematic block diagram illustrating a preferred embodiment of the color correction apparatus of the image system according to the present invention.

FIG. 5 is a block diagram roughly illustrating the preferred embodiment of the color correction apparatus of the image system, which illustrates another example using the scanner which is the typical color image input unit.

Identical reference numerals are allotted to the identical component parts which perform similar functions as in the embodiment of the color correction apparatus of the image system according to FIG. 4.

As shown in FIG. 5, the color correction apparatus 100 of the image system includes the photoelectric conversion unit 20 which radiates illuminating light having a certain light emitting spectrum to the object, and outputs the spectral information regarding the RGB colors reflected from the object after converting it into electrical signals. The apparatus also includes: a reference data storage unit 30 which stores reference gray level data and reference colorimetric data measured from an achromatic test pattern and a chromatic test pattern of a preset test pattern, respectively, by accumulating the data in a database system; a correction coefficient calculating unit 40 which calculates a gray level correction coefficient matrix to reduce an error between a gray level scanning data obtained by scanning the achromatic test pattern 11 received through the photoelectric conversion unit 20 and the reference gray level data to a minimum, performs a linear transformation applying the gray level correction coefficient matrix to colorimetric scanning data obtained by scanning the chromatic test pattern 12 through the photoelectric conversion unit 20, and calculates the color correction coefficient matrix which reduces the error between the colorimetric scanning data and reference colorimetric data to a minimum according to a certain color correction method; and a color correction unit 50 which receives the gray level correction coefficient matrix and color correction coefficient matrix from the correction coefficient calculating unit 40, performs the linear transformation applying the gray level correction coefficient matrix and applying the color correction coefficient matrix to the output of the photoelectric conversion unit 20, and outputs the result after converting it into a certain color coordinate system.

Here, the reference data storage unit 30 includes: a reference gray level data storage unit 32 which stores the reference gray level data measured through the optical densitometer from the achromatic test pattern 11 of the test pattern 10 by accumulating the data in the database system; and a reference colorimetric data storage unit 31 which stores the reference colorimetric data measured through the colorimeter from the chromatic test pattern 12 of the test pattern 10 by accumulating the data in the database system.

The correction coefficient calculating unit 40 includes: a gray level correction coefficient calculating unit 42 which calculates the gray level correction coefficient matrix which reduces the error between the gray level scanning data and reference gray level data to a minimum by receiving the gray level scanning data obtained by scanning the achromatic test pattern 11 through the photoelectric conversion unit 20; and a color correction coefficient calculating unit 41 which calculates a color correction coefficient matrix which reduces an error between a gray level correction colorimetric data and reference colorimetric data to a minimum according to a certain color correction method after forming the gray level correction colorimetric data through the linear transformation applying the gray level correction coefficient matrix to the colorimetric scanning data.

In addition, the color correction unit 50 includes: a gray level correction processing unit 52 which receives the gray level correction coefficient matrix from the gray level correction coefficient calculating unit 42, and performs the linear transformation applying the gray level correction coefficient matrix to the output of the photoelectric conversion unit 20; and a color correction processing unit 51 which performs the linear transformation applying the color correction coefficient matrix to the output of the gray level correction processing unit 52, and outputs the result after converting into a certain color coordinate system.

As described above, the test pattern 10 preferably includes: the achromatic test pattern 11 on which the achromatic color is divided equally at certain positions according to optical density; and the chromatic test pattern 12 using a Macbeth color rendition chart on which a plurality of chromatic colors are divided equally at other positions.

The certain color correction method is one of the linear transformation method, the polynomial transformation method, and the 3-dimensional look-up table method. Preferably, the certain color coordinate system is the XYZ color coordinate system of the Commission International de l'Eclairage (CIE), which is one of the device-independent color coordinate systems.

The operation of the preferred embodiment of the color correction apparatus of the image system according to the present invention is explained with reference to the attached drawings.

The operation of this embodiment of the color correction apparatus is on the assumption that the test pattern 10 includes the achromatic test pattern 11 comprised of the achromatic color and the chromatic test pattern 12 comprised of the chromatic colors, and the reference gray level data which is the optical density value and the reference colorimetric data which is the tri-stimuli of the CIE-XYZ color coordinate system, each measured through the optical densitometer and the colorimeter from the achromatic test pattern 11 and chromatic test pattern 12 of the test pattern 10 as stored in the reference gray level data storage unit 32 and reference colorimetric data storage unit 31, respectively.

First, the photoelectric conversion unit 20 equipped with a charge-coupled device (CCD) as a photoelectric conversion element radiates the illuminating light having a certain light-emitting spectrum toward the object. The photoelectric conversion unit 20 converts the spectral information about each of the RGB colors reflected from the object into electrical signals, and then outputs the signals.

The gray level correction coefficient calculating unit 42 of the correction coefficient calculating unit 40 calculates the gray level correction coefficient matrix which reduces an error between the gray level scanning data and reference gray level data to a minimum after receiving the gray level scanning data obtained by scanning the achromatic test pattern 11 through the photoelectric conversion unit 20. Similarly, the color correction coefficient calculating unit 41 of the correction coefficient calculating unit 40 calculates the color correction coefficient matrix which reduces the error between a gray level correction colorimetric data and the reference colorimetric data to a minimum according to a certain color correction method after forming the gray level correction colorimetric data by performing the linear transformation applying the gray level correction coefficient matrix to the colorimetric scanning data, At this time, the color correction method selects one of the linear transformation method, the polynomial transformation method, and the 3-dimensional look-up table method.

The reason for performing the gray level correction process by calculating the gray level correction coefficient matrix prior to calculating the color correction coefficient matrix is to have the good reproduction characteristic of the achromatic color in order to obtain good color reproduction characteristics. In addition, it is because a small variation in aspect of a color balance influences the achromatic color rather than the chromatic color.

The conventional gray level correction is explained as follows. The gray level correction is used to match the gray level reproduction characteristic with the visual characteristic of the human being. The aim of the gray level correction is to control the gradient between the optical density of the document image and optical density of the reproduction image so as to have linearity on two axes of the optical density of the document and optical density of the reproduction image. This gradient is called a γ curve or a gray level reproduction curve. In order to have the desirable gray level reproduction characteristic, it is necessary to perform a γ correction which provides linearity in the γ curve. The γ correction is the typical example of the gray level correction.

The gray level reproduction is used to enhance the similarity between the optical density of each of the RGB color signals of the document image and the optical density of the reproduction image. While color reproduction deals with the hue and saturation, gray level deals with the image reproduction capacity of the luminance.

Figure 6:
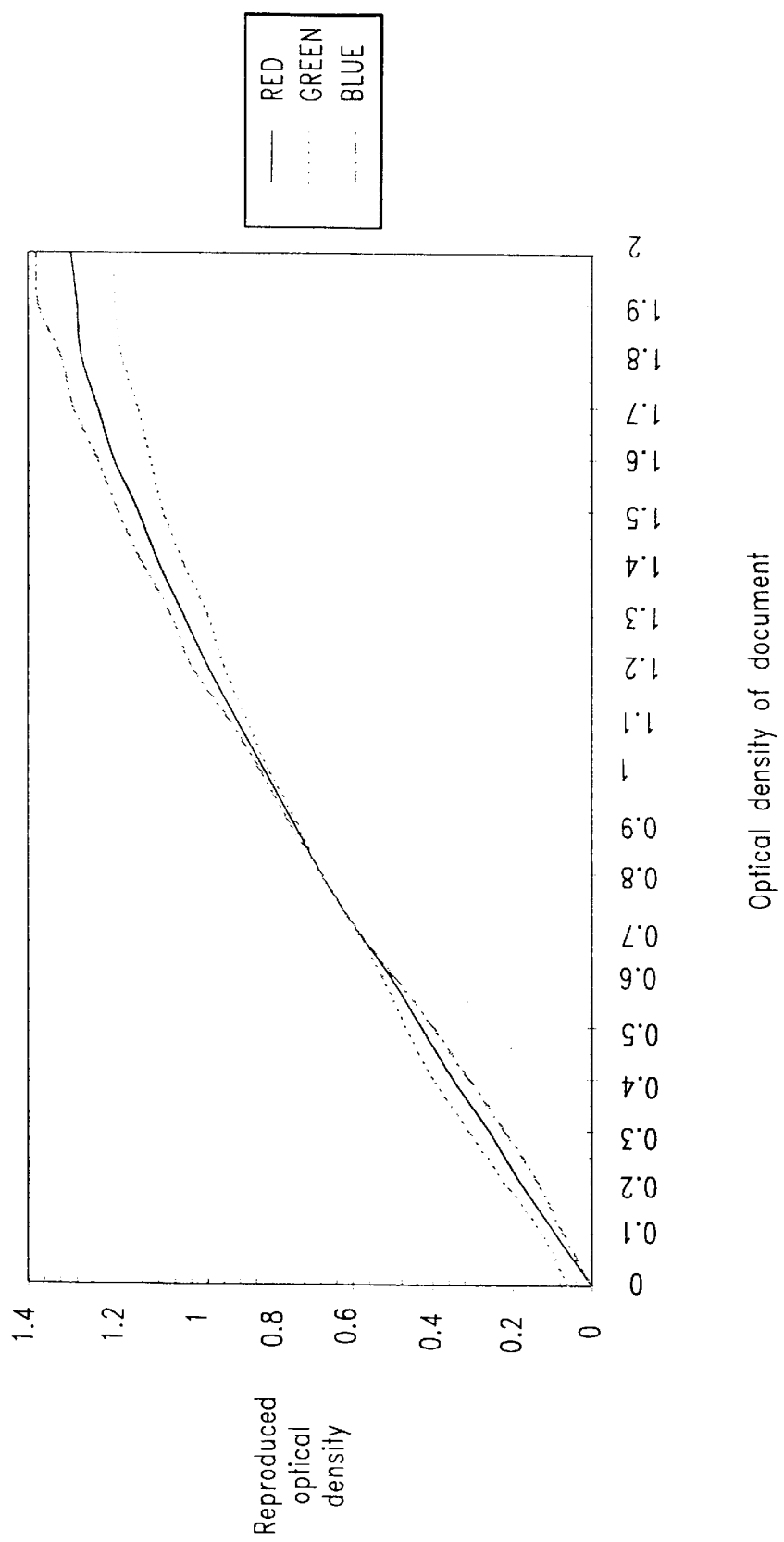
FIG. 6 is a graph illustrating gray level characteristics of an image system before performing a gray level correction.

FIG. 6 is a graph illustrating the gray level characteristics of the image system before performing the gray level correction. Referring to FIG. 6, the optical density of the reproduction image of the color image input unit is not matched with the optical density of the document, and this is the characteristic difference according to the RGB color signals.

Figure 7:
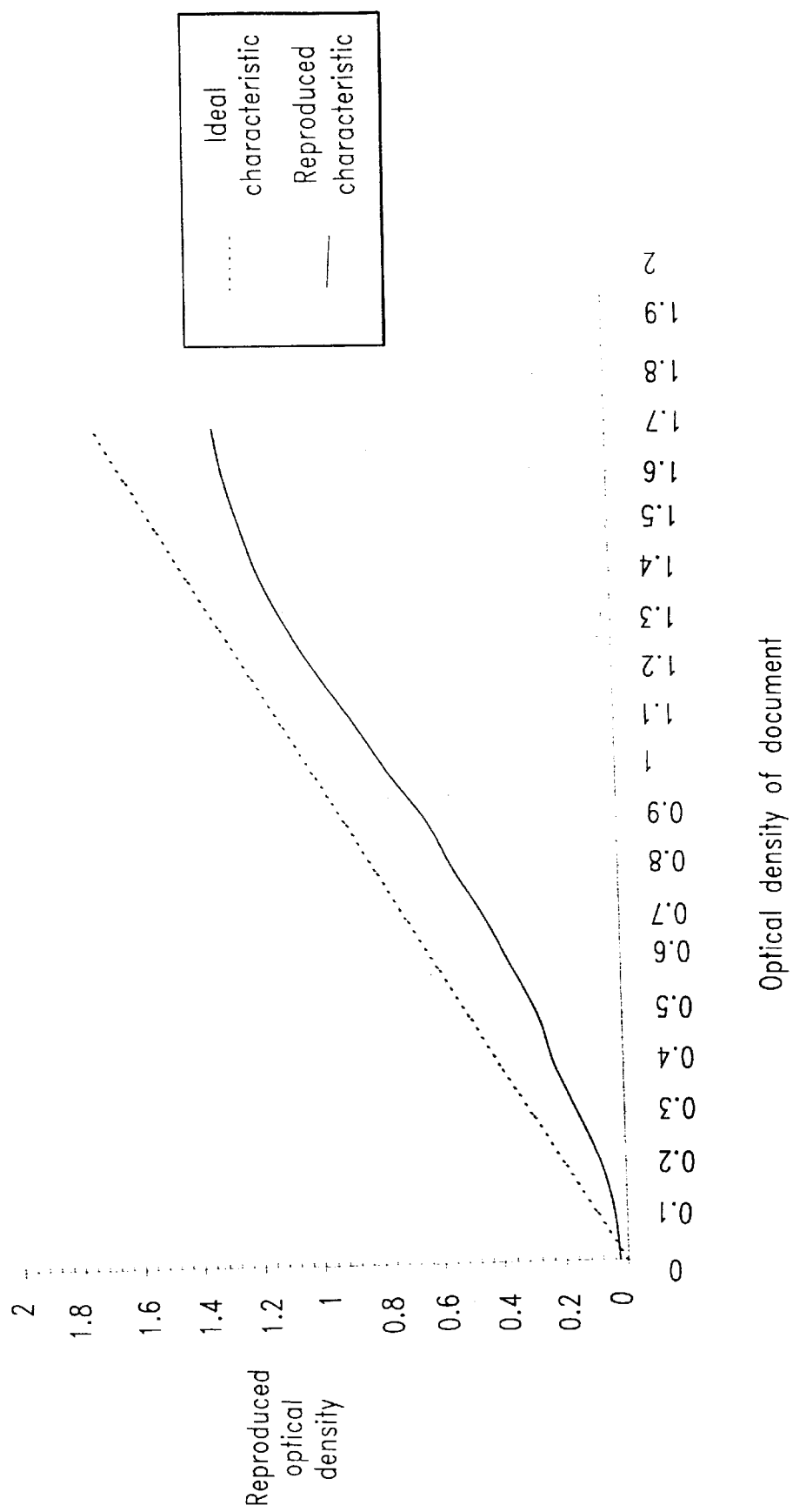
FIG. 7 is a graph for illustrating an ideal gray level correction.

FIG. 7 is a graph illustrating an ideal gray level correction. The solid line indicates the gray level reproduction characteristic of the luminance signal combining the RGB signal of the image system, such as a scanner, and the dotted line indicates an ideal gray level reproduction characteristic, which shows that the optical density of the document and the optical density of the reproduction image have linearity. In other words, the ideal gray level correction is intended to match the gray level reproduction characteristic of the image system indicated with a solid line with the ideal gray level reproduction characteristic indicated with a dotted line.

The reason for setting the reference coordinate values of the horizontal axis and vertical axis with the optical density OD is so that the photoelectric conversion element, such as a CCD, has a characteristic proportional to the reflectance, and the visual characteristic of the human being has an algebraic function characteristic of the reflectance. The relation between the optical density OD and reflectance $\Gamma$ is explained in the following formula 8:

$$OD = \left[-\log\frac{1}{\Gamma}\right] \quad (8)$$

which means that the human visual system is relatively insensitive to the variation of the light quantity of the bright light. Conversely, the human visual system is relatively sensitive to minute variation of the dark light.

The main factors of poor color balance are the color temperature of the illuminating light, spectral sensitivity characteristic, non-linear characteristic of an analog/digital converter and amplifiers of each RGB channels, etc. When proper actions are not taken, the color reproduction characteristic of the achromatic document, including shading elements, becomes poor. In other words, the achromatic image has chromatic elements in the reproduction image. This means that the hue element has a value other than 0 degree in a color ring.

Finally, the color correction unit 50 receives the gray level correction coefficient matrix from the gray level correction coefficient calculating unit 42 through the gray level correction processing unit 52, performs the linear transformation applying the gray level correction coefficient matrix to the output of the photoelectric conversion unit 20, and then outputs the result. The color correction unit 50 subsequently receives the output of the gray level correction processing unit 52 through the color correction processing unit 51, performs the linear transformation applying the color correction coefficient matrix to the output of the gray level correction processing unit 52, and then outputs the result by converting it into the CIE-XYZ color coordinate system, which is the device-independent color coordinate system.

The correction coefficient calculating unit 40, preferably, further includes a color correction conversion matrix calculating unit (not illustrated) which calculates the color correction conversion matrix through matrix multiplication in the order of the gray level correction coefficient matrix and the color correction coefficient matrix. The color correction unit 50 has a benefit in processing speed when performing the linear transformation once by applying the color correction conversion matrix to the output of the photoelectric conversion unit 20, as opposed to performing the linear transformation using the gray level correction coefficient matrix to the output of the photoelectric conversion unit 20, and then successively performing the linear transformation applying the color correction coefficient matrix.

The duplicate performance of linear transformation can be replaced by one performance, and the results of these two cases are the same.

Figure 8A:
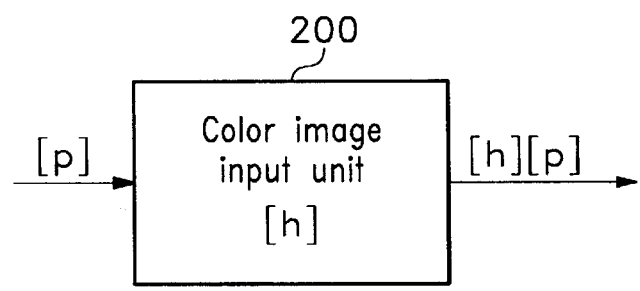
FIGS. 8A and 8B are conceptual views illustrating a preferred embodiment of the color correction apparatus of the image system according to the present invention.
Figure 8B:
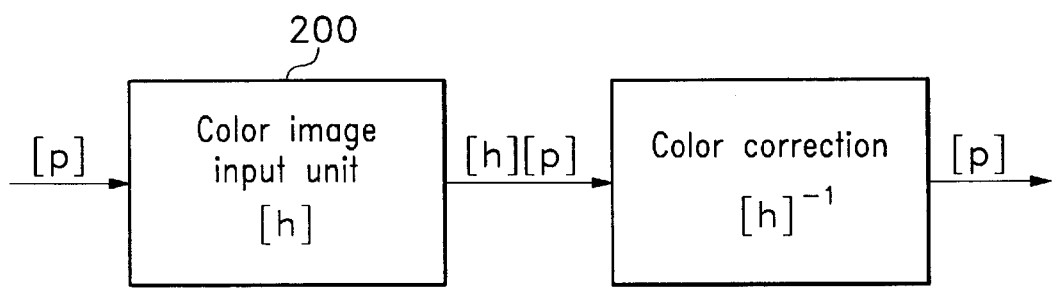

FIGS. 8A and 8B are conceptual views illustrating the preferred embodiment of the color correction apparatus of the image system according to the present invention. FIG. 8A is a block diagram illustrating a system model of the color image input unit where color correction is not performed; and FIG. 8B is a block diagram illustrating a system model of the color image input unit where color correction is performed.

As shown in FIG. 8A, assuming that the color distortion characteristic of the color image input unit 200 is indicated as a matrix [h], and the RGB signal of the input data is indicated as $[P]=[R \ G \ B]^T$, when the input data $[P]=[R \ G \ B]^T$ is applied to the color image input unit 200, the output [S] of the color image input unit 200 is indicated in the following equation: $[S]=[h][p]$. Here, the $^T$ means a transpose matrix.

Assuming that the color correction conversion matrix which is applied to obtain the same output as the input data by removing the color distortion characteristic is [M], the complete color correction is performed when satisfying the following equation $[S_{cc}]=[M][h][P]=[P]$, as shown in FIG. 8B, wherein $[S_{cc}]$ is the output whose color is corrected.

In other words, ideal color correction can be performed when the color correction conversion matrix [M] becomes an inverse matrix $[h]^{-1}$ of the color distortion matrix [h].

However, since there are many physical restrictions in calculating the accurate inverse matrix $[h]^{-1}$ of the color distortion matrix [h] by analyzing the color distortion characteristic, the essence of the color correction process is to calculate the color correction conversion matrix capable of optimally approaching the inverse matrix $[h]^{-1}$ of the color distortion matrix [h] within the restriction.

Hereinafter, one embodiment of the color correction method of the image system according to the present invention is explained with reference to FIG. 9.

As shown in FIG. 9, the color correction method of the image system, which performs the color correction process through linear transformation, applying the color correction conversion matrix to the input data obtained by scanning the input target document, includes the steps of: generating colorimetric scanning data by scanning the chromatic test pattern 12 of the test pattern 10 (step 1); and calculating a color correction conversion matrix which reduces an error between the reference colorimetric data and colorimetric scanning data to a minimum according to a certain color correction method by reading the reference colorimetric data from the storage medium which stores the reference colorimetric data measured from the chromatic test pattern 12 (step 2).

The chromatic test pattern 12 of the test pattern 10 is a pattern using a Macbeth color rendition chart in which a plurality of chromatic colors are equally divided in other positions.

Moreover, the certain color correction method is one of the linear transformation method, the polynomial transformation method, and the 3-dimensional look-up table method.

The process of the preferred embodiment of the color correction method of the image system according to the present invention is explained, referring to FIGS. 4 to 9.

The process of the color correction method is on the assumption that the test pattern 10 includes the chromatic test pattern 12 comprised of the chromatic colors, and the reference gray level data which is the optical density value measured through the optical densitometer from the chromatic test pattern 12 of the test pattern 10 as stored in the reference colorimetric data storage unit 31.

First, after generating the colorimetric scanning data by scanning the chromatic test pattern 12 of the test pattern 10 through the photoelectric conversion unit 20 at step S1 of generating the scanning data, the color correction conversion matrix which reduces the error between the reference colorimetric data and colorimetric scanning data to a minimum is calculated by reading the reference colorimetric data from the reference colorimetric data storage unit 31 through one of the linear transformation method, the polynomial transformation method and the 3-dimensional look-up table method at step S2 of calculating the color correction conversion matrix.

The actual color correction process is performed through the linear transformation by applying the color correction conversion matrix calculated at step 2 to the input data obtained by scanning the input target document.

At this time, after performing the linear transformation applying the gray level correction coefficient matrix to the output of the photoelectric conversion unit 20 and outputting the result, the output of the gray level correction processing unit 52 is received through the color correction processing unit 51. After performing the linear transformation applying the color correction coefficient matrix to the output of the gray level correction processing unit 52, the result is converted into the XYZ color coordinate system of CIE, which is the device-independent color coordinate system, and is then outputted.

Hereinafter, the preferred embodiment of the color correction method of the image system according to the present invention is explained with reference to FIG. 10.

Figure 10:
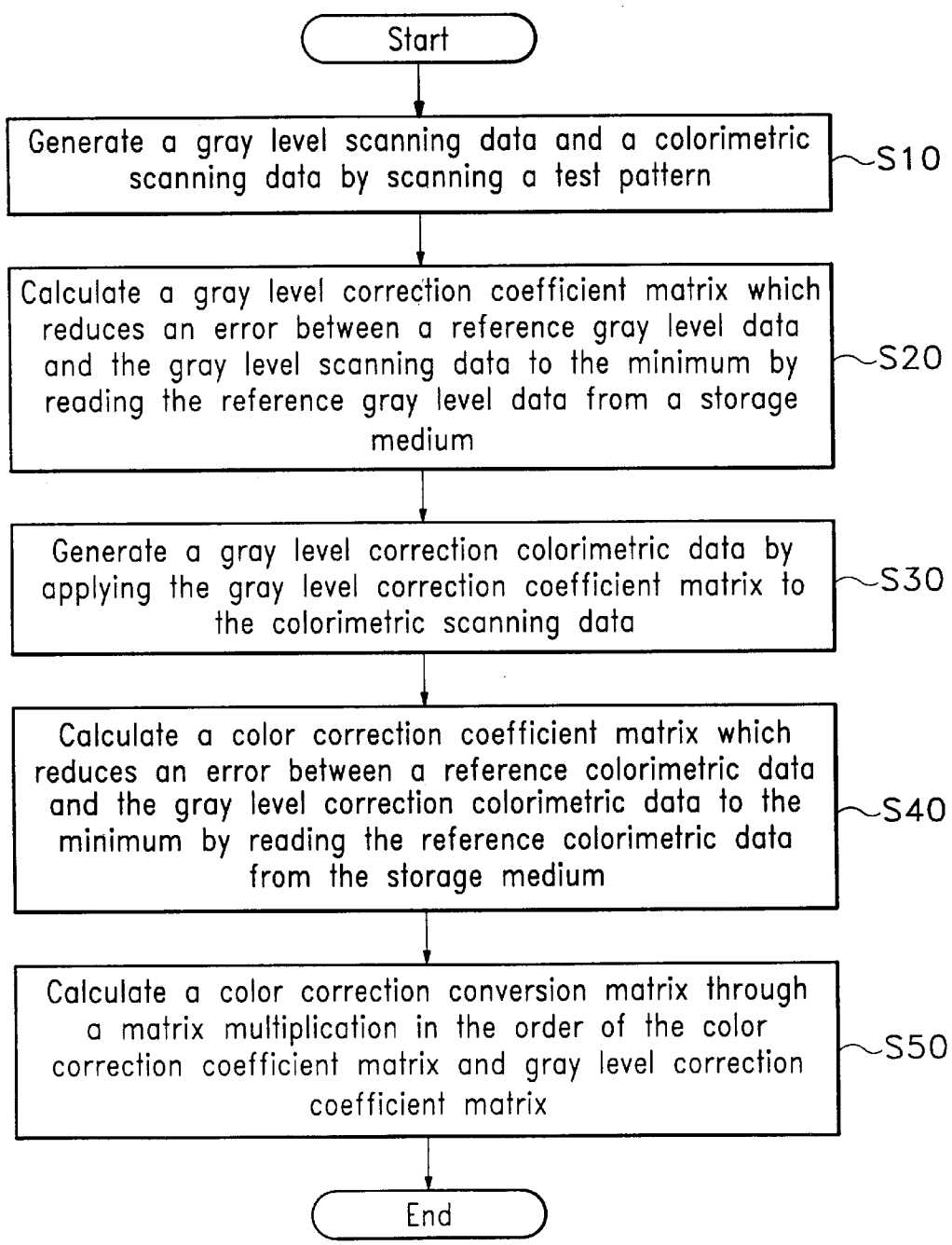
FIG. 10 is a flowchart illustrating another embodiment of the color correction method of the image system according to the present invention.

FIG. 10 is a flowchart illustrating the preferred embodiment of the color correction method.

As shown in the drawing, the color correction method of the image system which performs the color correction process through linear transformation, applying the color correction conversion matrix to the input data obtained by scanning the input target document, includes the steps of: generating scanning data of a gray level scanning data and a colorimetric scanning data by scanning an achromatic test pattern 11 and a chromatic test pattern 12 of a preset test pattern 10, respectively (step S10); calculating a gray level correction coefficient matrix which reduces an error between the reference gray level data and the gray level scanning data to a minimum by reading the reference gray level data from the storage medium which stores the reference gray level data previously measured from the achromatic test pattern 11 (step S20); performing gray level correction for acquiring a linearity of gray level characteristics regarding each color by generating a gray level correction colorimetric data through the linear transformation applying the gray level correction coefficient matrix to the colorimetric scanning data (step S30); calculating a color correction coefficient for calculating a correction coefficient matrix which reduces an error between a reference colorimetric data and the gray level correction colorimetric data to a minimum according to a certain color correction method by reading the reference colorimetric data from the storage medium which stores the reference colorimetric data previously measured from the chromatic test pattern 12 (step S40); and calculating a color correction conversion matrix through the matrix multiplication in the order of the color correction coefficient matrix and the gray level correction coefficient matrix (step S50).

The test pattern 10 includes the achromatic test pattern 11 in which the achromatic color is equally divided in certain positions according to optical density, and the chromatic test pattern 12 which uses the Macbeth color rendition chart in which a plurality of chromatic colors are equally divided in its other positions.

The certain color correction method is, preferably, one of the linear transformation method, the polynomial transformation method, and the 3-dimensional look-up table method. The certain color coordinate system is desirably the XYZ color coordinate of CIE, which is one of the device-independent color coordinate system.

The process of the color correction method of the image system according to the present invention is explained, referring to FIGS. 5 to 10.

At step S10, the gray level scanning data and colorimetric scanning data are generated by scanning the achromatic test pattern 11 and chromatic test pattern 12, respectively, of the test pattern 10 through the photoelectric conversion unit 20.

Afterwards, at step S20, by reading the reference gray level data from the reference gray level data storage unit 32, which stores the reference gray level data previously measured from the achromatic test pattern 11, the gray level correction coefficient matrix, which reduces the error between the reference gray level data and the gray level scanning data to a minimum, is calculated. At step S30, the linearity of gray level characteristics of each color is obtained by generating the gray level correction colorimetric data through the linear transformation, applying the gray level correction coefficient matrix to the colorimetric scanning data.

At step S40, by reading the reference colorimetric data from the reference colorimetric data storage unit 31, which stores the reference colorimetric data previously measured from the chromatic test pattern 12, the color correction coefficient matrix which reduces the error between the reference colorimetric data and the gray level correction colorimetric data to a minimum is calculated according to the certain color correction method. Finally, at step S50, the color correction conversion matrix is calculated by the matrix multiplication in the order of the color correction coefficient matrix and the gray level correction coefficient matrix through the color correction conversion matrix calculating unit (not illustrated).

The actual color correction process is performed through linear transformation, applying the color correction conversion matrix calculated at step S50 to the input data obtained by scanning the input target document.

After performing linear transformation, applying the gray level correction coefficient matrix to the output of the photoelectric conversion unit 20, and outputting the result, the output of the gray level correction processing unit 52 is received through the color correction processing unit 51. Similarly, after performing the linear transformation, applying the color correction coefficient matrix to the output of the gray level correction processing unit 52, the result is outputted after converting it into the XYZ color coordinate system of the CIE, which is the device-independent color coordinate system.

Here, the step S40 of calculating the color correction coefficient is explained in detail. The step S40 is a process of obtaining the color correction coefficient matrix by substituting the relation between the data obtained by scanning the chromatic test pattern 12 and the gray level correction colorimetric data into the aforesaid formula 5 or 6, under the condition that gray level correction of the image system according to RGB channels is actually completed through the process of calculating the gray level correction coefficient matrix, (i.e., under the condition that the linearity of gray level characteristics of RGB colors of the image system is acquired).

For easier understanding, assume that the reference colorimetric data, which are the measuring values of the chromatic colors of the test pattern 10, are accumulated in a database system inside of the image system, and then are $P_{Ri}$, $P_{Gi}$ and $P_{Bi}$, and the gray level correction colorimetric data generated through the linear transformation, applying the gray level correction coefficient matrix to the colorimetric scanning data, (i.e., the scanning values of each of the chromatic colors included in the chromatic test pattern 12), are $S_{Ri}$, $S_{Gi}$ and $S_{Bi}$. Here, i is an index value of each of the chromatic colors, which has the value of 1, 2, 3, . . . n. The term n indicates the total number of chromatic colors.

For easier explanation, assuming that the certain color correction method adopts the linear transformation method for a 3×3 matrix, the process of calculating the color correction coefficient matrix is explained.

Assuming that estimated values, whose color is corrected by a proper color correction filter as in the formula (5), are $P_{Ri}$, $P_{Gi}$ and $P_{Bi}$, the color correction coefficient matrix can be calculated by calculating a least mean square error (LMSE) of all the chromatic colors with a condition which reduces an error between the gray level correction colorimetric data $S_{Ri}$, $S_{Gi}$ and $S_{Bi}$ and the color corrected estimated values $P_{Ri}$, $P_{Gi}$ and $P_{bi}$ to a minimum.

In other words, the least mean square errors of the gray level correction colorimetric data $S_{Ri}$, $S_{Gi}$ and $S_{Bi}$ and the color corrected estimated values $P_{Ri}$, $P_{Gi}$ and $P_{bi}$ are indicated as in the following formula (9):

$$MIN \sum_i (\Delta R_i) = MIN \sum_i (P_{Ri} - \underline{P_{Ri}})^2 \quad (9)$$
$$= MIN \sum_i \{P_{Ri} - (a_{11}S_R + a_{12}S_G - a_{13} + S_B)\}^2$$

$$MIN \sum_i (\Delta G_i) = MIN \sum_i (P_{Gi} - \underline{P_{Gi}})^2$$
$$= MIN \sum_i \{P_{Gi} - (a_{21}S_R + a_{22}S_G - a_{23} + S_B)\}^2$$

$$MIN \sum_i (\Delta B_i) = MIN \sum_i (P_{Bi} - \underline{P_{Bi}})^2$$
$$= MIN \sum_i \{P_{Bi} - (a_{31}S_R + a_{32}S_G - a_{33} + S_B)\}^2$$

In order to satisfy the formula (9), a necessary condition is indicated in the following formula (10):

$$\frac{\partial \sum_i (\Delta R_i)^2}{\partial a_{11}} = 0, \quad \frac{\partial \sum_i (\Delta R_i)^2}{\partial a_{12}} = 0, \quad \frac{\partial \sum_i (\Delta R_i)^2}{\partial a_{13}} = 0 \quad (10)$$

$$\frac{\partial \sum_i (\Delta G_i)^2}{\partial a_{21}} = 0, \quad \frac{\partial \sum_i (\Delta G_i)^2}{\partial a_{22}} = 0, \quad \frac{\partial \sum_i (\Delta G_i)^2}{\partial a_{23}} = 0$$

$$\frac{\partial \sum_i (\Delta B_i)^2}{\partial a_{31}} = 0, \quad \frac{\partial \sum_i (\Delta B_i)^2}{\partial a_{32}} = 0, \quad \frac{\partial \sum_i (\Delta B_i)^2}{\partial a_{33}} = 0$$

Referring to the formula (10), the color correction coefficient matrix is obtained as in the following formula (11):

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} S_R P_R & S_G P_R & S_B P_R \\ S_R P_G & S_G P_G & S_B P_G \\ S_R P_B & S_G P_B & S_B P_B \end{bmatrix} \begin{bmatrix} S_R S_R & S_R S_R & S_R S_R \\ S_R S_G & S_G S_G & S_G S_B \\ S_R S_B & S_G S_B & S_B S_B \end{bmatrix} \quad (11)$$

$$S_K P_K = \sum_i (S_{Ki} P_{ki}), \quad S_K S_K = \sum_i (S_{ki} S_{ki})$$

$$K = R, G, B, \quad i = 1, 2, 3, \ldots n$$

where i is the index of each of the chromatic colors and n is the total number of chromatic colors.

By repeatedly performing the process of the present invention, which is performed in the order of steps S10, S20, S30, S40 and S50, a more accurate color correction conversion matrix is calculated, thereby maximizing the efficiency of the present invention.

Hereinafter, another embodiment of the color correction method of the image system is explained with reference to FIG. 11.

As shown in the drawing, the color correction method of the image system, which performs color correction process through the linear transformation, applying a color correction conversion matrix to a input data obtained by scanning an input target document, includes the steps of: generating an output test pattern including an achromatic output pattern and a chromatic output pattern by reading reference gray level data and reference colorimetric data previously measured from the achromatic test pattern 11 and chromatic test pattern 12, repsectively, of the preset test pattern 10, and outputs the reference gray level data and reference colorimetric data through a color image output unit (step S100); generating scanning data of a gray level scanning data and a colorimetric scanning data by scanning the achromatic output pattern and chromatic output pattern included in the output test pattern, respectively (step S110); calculating a gray level correction coefficient for calculating a gray level correction coefficient matrix which reduces an error between the reference gray level data and the gray level scanning data to a minimum by reading the reference gray level data from the storage medium which stores the reference gray level data (step S120); performing a gray level correction for acquiring a linearity of gray level characteristics regarding each color by generating a gray level correction colorimetric data through the linear transformation, applying the gray level correction coefficient matrix to the colorimetric scanning data (step S130); calculating a color correction coefficient for calculating a color correction coefficient matrix, which reduces an error between the reference colorimetric data and the gray level correction colorimetric data to a minimum according to a certain color correction method, by reading the reference colorimetric data from the storage medium which stores the reference colorimetric data (step S140); and calculating a color correction conversion matrix through matrix multiplication in the order of the color correction coefficient matrix and the gray level correction coefficient matrix (step S150).

The test pattern 10 includes the achromatic test pattern 11 on which the achromatic color is divided equally at certain positions according to the optical density; and the chromatic test pattern 12 uses the Macbeth color rendition chart on which a plurality of chromatic colors are divided equally at another positions.

The certain color correction method is one of the linear transformation method, the polynomial transformation method, and the 3-dimensional look-up table method.

Figure 11:
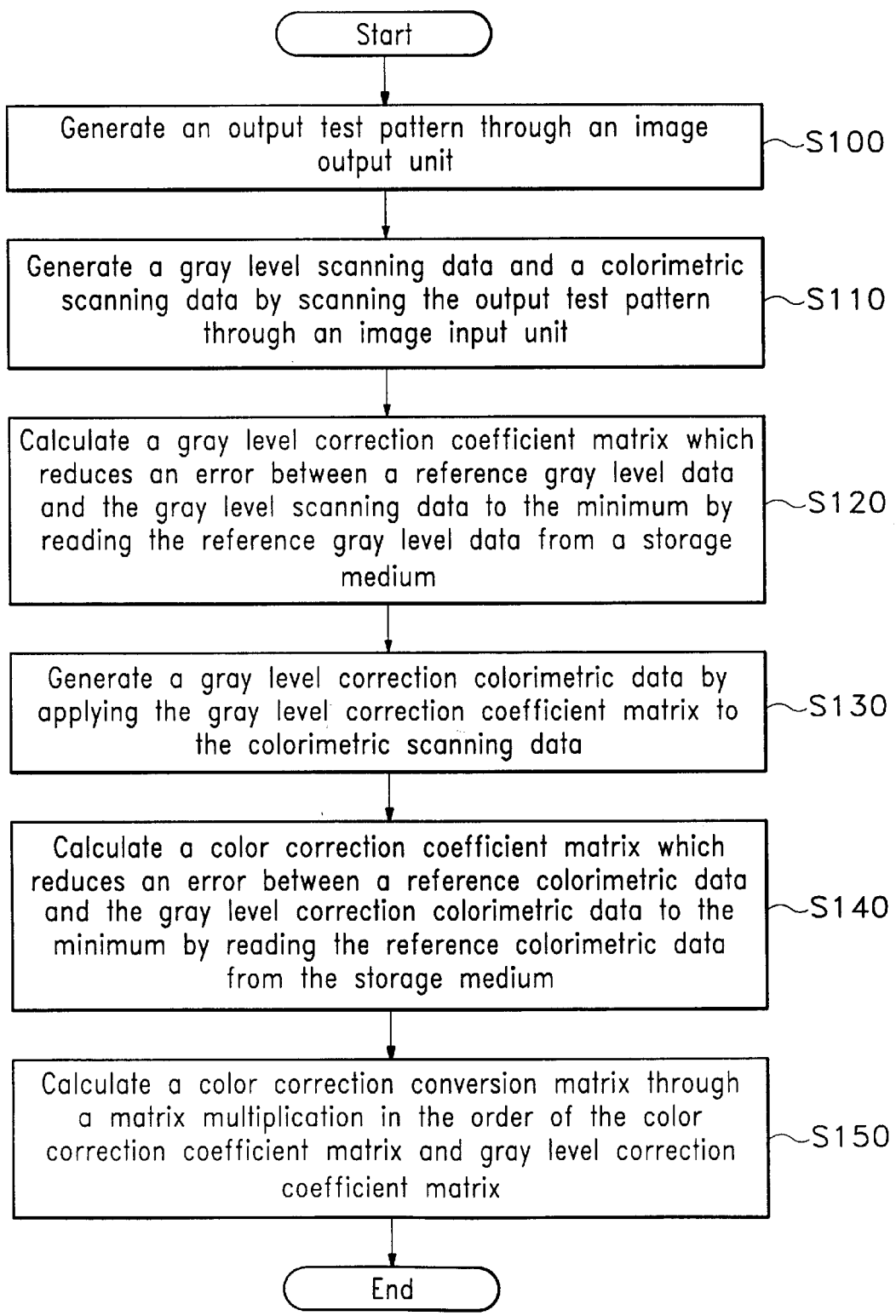
FIG. 11 is a flowchart illustrating another embodiment of the color correction method of the image system according to the present invention.
Figure 12:
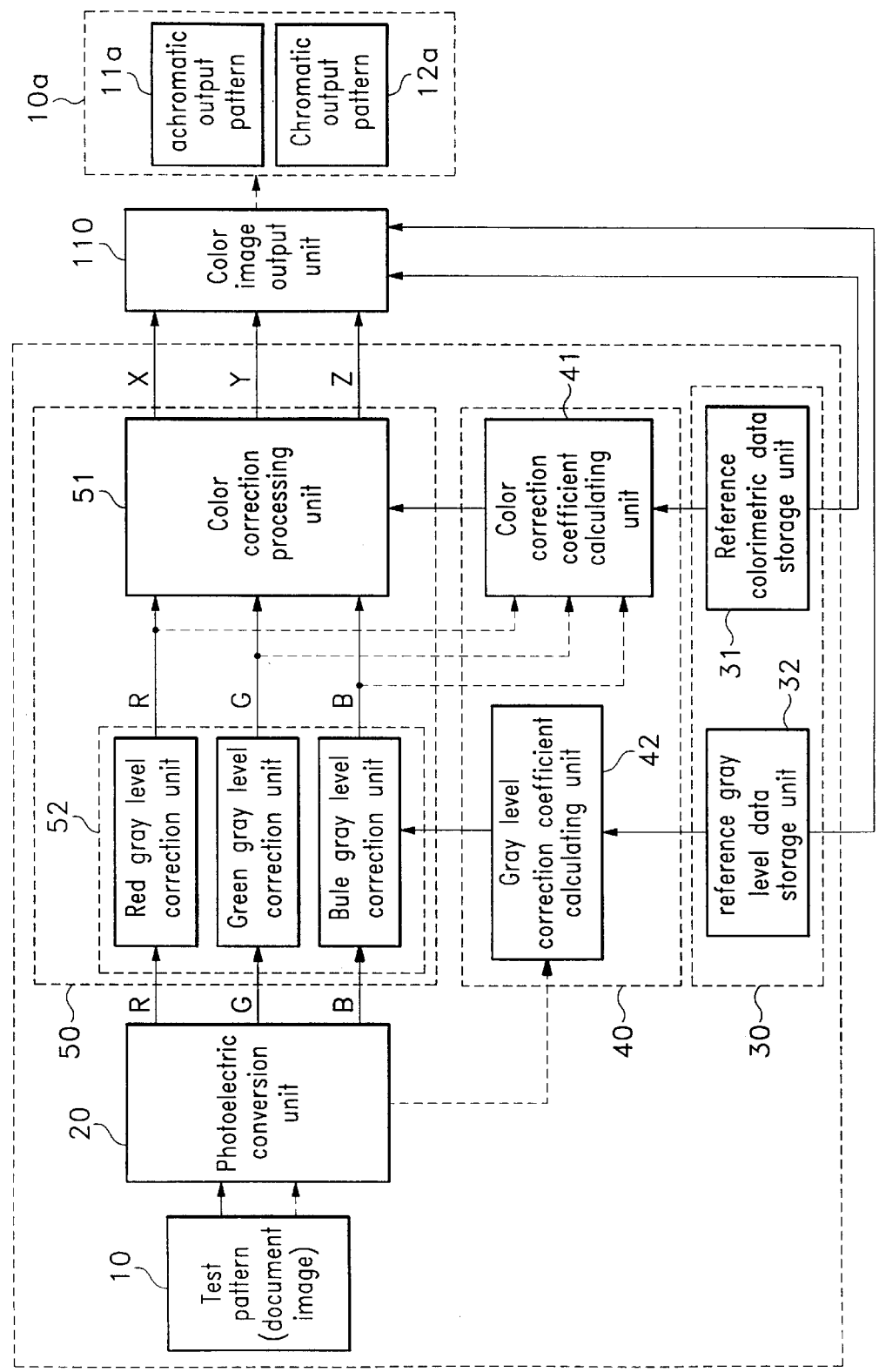
FIG. 12 is a block diagram illustrating another embodiment of the color correction apparatus of the image system according to the present invention.

Referring to FIGS. 11 to 12, the process of another embodiment of the color correction method of the image system is explained.

Prior to explaining the process of the color correction method of the image system, another embodiment of the color correction apparatus of the image system according to the present invention is explained with reference to FIG. 12.

FIG. 12 is a block diagram illustrating another embodiment of the color correction apparatus of the image system, which shows the structure of an example combining a scanner, (i.e., the typical color image input unit) and a printer, (i.e., the typical color image output unit).

Identical reference numerals are allotted to the same component parts which perform similar functions as in the embodiment of the color correction apparatus of the image system shown in FIG. 5.

The color correction apparatus of the image system includes a photoelectric conversion unit 20 which radiates an illuminating light having a certain light emitting spectrum to an object, and outputs the spectral information regarding the RGB colors reflected from the object after converting it into electrical signals. The apparatus also includes: a reference data storage unit 30 which stores reference gray level data and reference colorimetric data measured from an achromatic test pattern 11 and a chromatic test pattern 12 of a preset test pattern 10, respectively, by accumulating the data in a database system; a color image output unit 110 which outputs an output test pattern 10a, including an achromatic output pattern 11a and a chromatic output pattern 12a, after reading the reference gray level and the reference colorimetric data, respectively, from the reference data storage unit 30; a correction coefficient calculating unit 40 which calculates a gray level correction coefficient matrix which reduces an error between a gray level scanning data and the reference gray level data to a minimum by receiving the gray level scanning data obtained by scanning the achromatic output pattern 11a through the photoelectric conversion unit 20, and then calculates a color correction coefficient matrix which reduces an error between a colorimetric scanning data and the reference scanning data to a minimum after performing a linear transformation, applying the gray level correction coefficient matrix to the colorimetric scanning data obtained by scanning the chromatic output pattern 12a through the photoelectric conversion unit 20; and a color correction unit 50 which performs linear transformation, applying the gray level correction coefficient matrix and the color correction coefficient matrix to the output of the photoelectric conversion unit 20 after receiving the gray level correction coefficient matrix and color correction coefficient matrix from the correction coefficient calculating unit 40, and then outputs the result after converting into a certain color coordinate system.

Here, the reference data storage unit 30 includes: a reference gray level data storage unit 32 which stores the reference gray level data measured through an optical densitometer from the achromatic test pattern 11 of the test pattern by accumulating the data in the database system; and a reference colorimetric data storage unit 31 which stores the reference colorimetric data measured through a colorimeter from the chromatic test pattern 12 of the test pattern 10 by accumulating the data in the database system.

In addition, the correction coefficient calculating unit 40 includes: a gray level correction coefficient calculating unit 42 which calculates the gray level correction coefficient matrix which reduces the error between the gray level scanning data and reference gray level data to a minimum by receiving the gray level scanning data obtained by scanning the achromatic output pattern 11 a through the photoelectric conversion unit 20; and a color correction coefficient calculating unit 41 which calculates a color correction coefficient matrix which reduces an error between a gray level correction colorimetric data and the reference colorimetric data to a minimum according to a certain color correction method after forming the gray level correction colorimetric data by performing linear transformation, applying the gray level correction coefficient matrix to the colorimetric scanning data obtained by scanning the chromatic output pattern 12a.

The color correction unit 50 includes: a gray level correction processing unit 52 which receives the gray level correction coefficient matrix from the gray level correction coefficient calculating unit 42, and performs the linear transformation applying the gray level correction coefficient matrix to the output of the photoelectric conversion unit 20; and a color correction processing unit 51 which performs the linear transformation applying the color correction coefficient matrix to the output of the gray level correction processing unit 52, and outputs the result after converting into a certain color coordinate system.

As described above, the test pattern 10 includes: the achromatic test pattern 11 on which the achromatic color is evenly divided at predetermined positions according to the optical density; and the chromatic test pattern 12 on which a plurality of chromatic colors are divided at another positions.

In addition, the certain color correction method is one of the linear transformation method, the polynomial transformation method, and the 3-dimensional look-up table method. Preferably, the certain color coordinate system is the XYZ color coordinate system of the Commission International de l'Eclairage (CIE), which is one of the device-independent color coordinate systems.

The process of another embodiment of the color correction method according to the present invention is explained with reference to FIGS. 11 and 12.

First, at step S100, the output test pattern 10a including the achromatic output pattern 11a and chromatic output pattern 12a is generated by reading the reference gray level data and reference colorimetric data from the reference data storage unit 30 through the color image output unit 110. At step S110, the gray level scanning data and colorimetric scanning data are generated by scanning the achromatic output pattern 11a and chromatic output pattern 12a respectively, included in the output test pattern 10a through the photoelectric conversion unit 20.

At step S120, by reading the reference gray level data from the reference gray level data storage unit 32, which stores the reference gray level data, the gray level correction coefficient calculating unit 42 calculates the gray level correction coefficient matrix, which reduces an error between the reference gray level data and gray level scanning data to a minimum. At step S130, the gray level correction processing unit 52 obtains the linearity of gray level characteristics regarding each color by generating the gray level correction colorimetric data through linear transformation, applying the gray level correction coefficient matrix to the colorimetric scanning data.

At step S140, the color correction coefficient calculating unit 41 calculates the color correction coefficient matrix which reduces an error between the reference colorimetric data and gray level correction colorimetric data to a minimum according to a certain color correction method by reading the reference colorimetric data from the reference colorimetric data storage unit 31 which stores the reference colorimetric data. At step S150, the color correction conversion matrix calculating unit (not illustrated) calculates the color correction conversion matrix through matrix multiplication in the order of the color correction coefficient matrix and the gray level correction coefficient matrix.

The step S140 is now explained in detail. It is a process of obtaining a color correction coefficient matrix by substituting the relation between the data obtained by scanning the chromatic test pattern 12 and the gray level correction colorimetric data into the aforesaid formula (5) or formula (6), under the condition that gray level correction of the image system according to RGB channels is actually completed through the process of calculating the gray level correction coefficient matrix (i.e., under the state that the linearity of gray level characteristics of RGB colors of the image system is acquired). Since the process of step S140 is similar to that of step S40, repeated explanation is omitted.

Figure 13A:
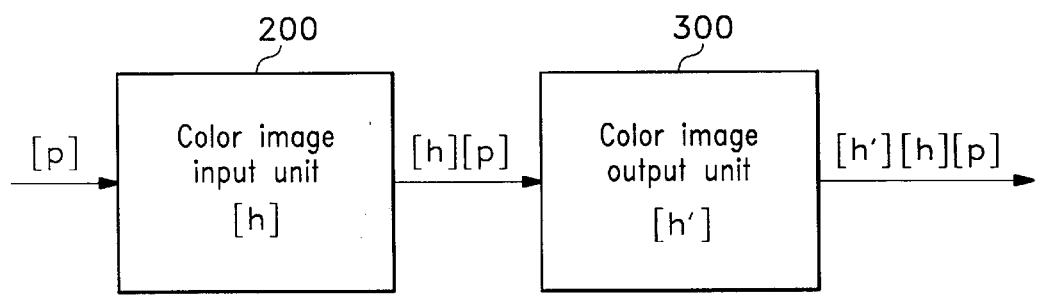
FIGS. 13A and 13B are conceptual views illustrating another embodiment of the color correction apparatus of the image system according to the present invention.
Figure 13B:
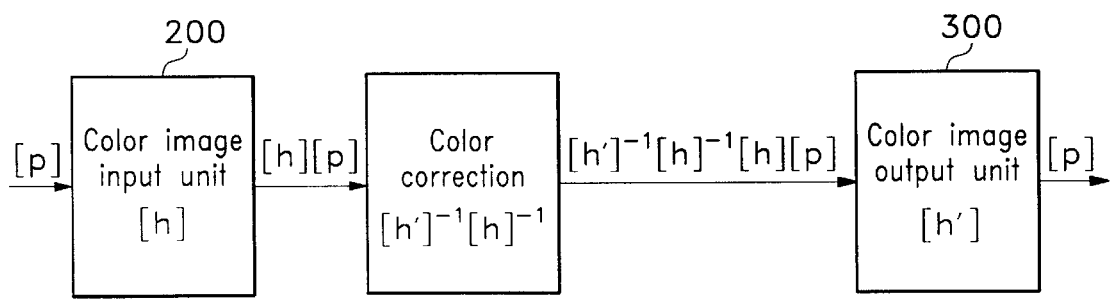

FIGS. 13A and 13B are conceptual views illustrating the preferred embodiment of the color correction apparatus of the image system according to the present invention. FIG. 13A is a block diagram illustrating a system model which combines the color image input unit and color image output unit in which the color correction is not performed; and FIG. 13B is a block diagram illustrating a system model which combines the color image input unit and color image output unit in which the color correction is performed.

As shown in FIG. 13A, assuming that the color distortion characteristics of the color image input unit 200 and color image output unit 110 are indicated as matrixes [h] and [h'], respectively, and the RGB signal of the input data is indicated as $[P]=[R\ G\ B]^T$, when the input data $[P]=[R\ G\ B]^T$ is applied to the color image input unit 200, the output [S] of the color image input unit 200 is indicated in the equation of $[S]=[h][p]$, and the output [S'] of the color image output unit 110 is indicated in the equation of $[S']=[h'][h][P]$. Here, the $^T$ means a transpose matrix.

Assuming that the color correction conversion matrix which is applied to obtain the same output as the input data by removing the color distortion characteristic is [M], the complete color correction is performed when satisfying the following equation $[S'_{cc}]=[M][h][h'][P]=[P]$, as shown in FIG. 13B, wherein $[S'_{cc}]$ is the output whose color is corrected.

In other words, ideal color correction can be performed when the color correction conversion matrix [M] becomes an inverse matrix $[h']^{-1}[h]^{-1}$ of the color distortion matrix of the color image input unit 200 and color image output unit 110.

However, since there are many physical restrictions in calculating the accurate inverse matrix $[h']^{-1}[h]^{-1}$ of the color distortion matrix by accurately analyzing the color distortion characteristic, the essence of the color correction process is to calculate the color correction conversion matrix [M] capable of optimally approaching the inverse matrix $[h']^{-1}[h]^{-1}$ of the color distortion matrix of the color image input unit 200 and color image output unit 110 within the restriction.

In the embodiment of the color correction apparatus of the image system according to the present invention, the color image output unit 110 generates the output test pattern by reading the reference gray level data and reference colorimetric data from the reference data storage unit 30. It is also possible to generate the output test pattern by locating a storage medium in the color image output unit 110 to perform a function similar to the reference data storage unit 30.

As described above, the color correction apparatus of the image system according to the preferred embodiment of the present invention lessens the burden of managing and keeping the test pattern. In addition, a more accurate color correction process can be performed by repeatedly performing the operation of applying the color-corrected output test pattern outputted from the color image output unit 110 to the color image input unit 200 after performing color correction once.

In order words, by repeatedly performing the process of the present invention, which is performed in the order of steps 110, 120, 130, 140 and 150, a more accurate color correction conversion matrix is calculated, thereby maximizing the efficiency of the present invention.

Figure 14A:
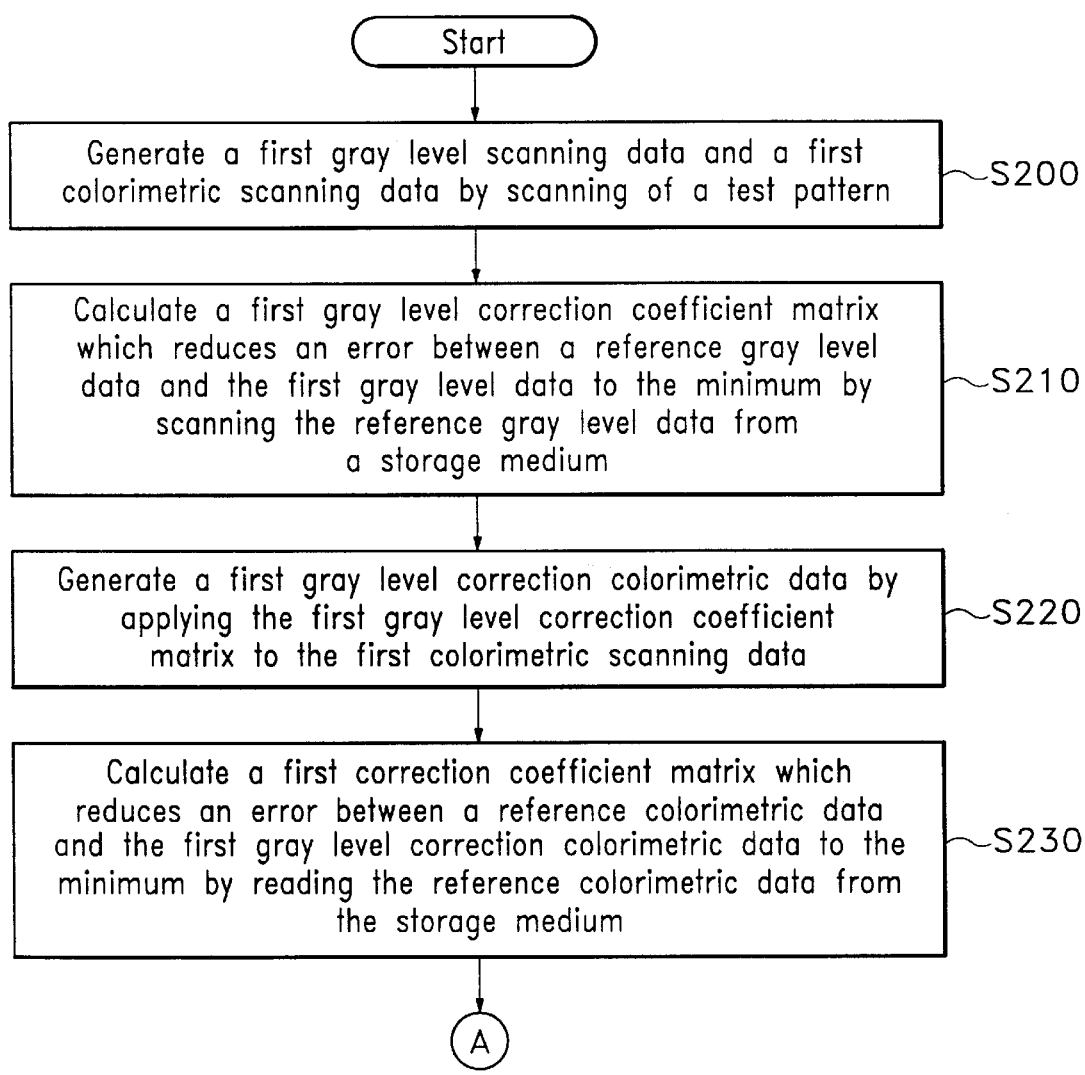
FIGS. 14A and 14B are a flow chart illustrating another embodiment of the color correction method of the image system according to the present invention.
Figure 14B:
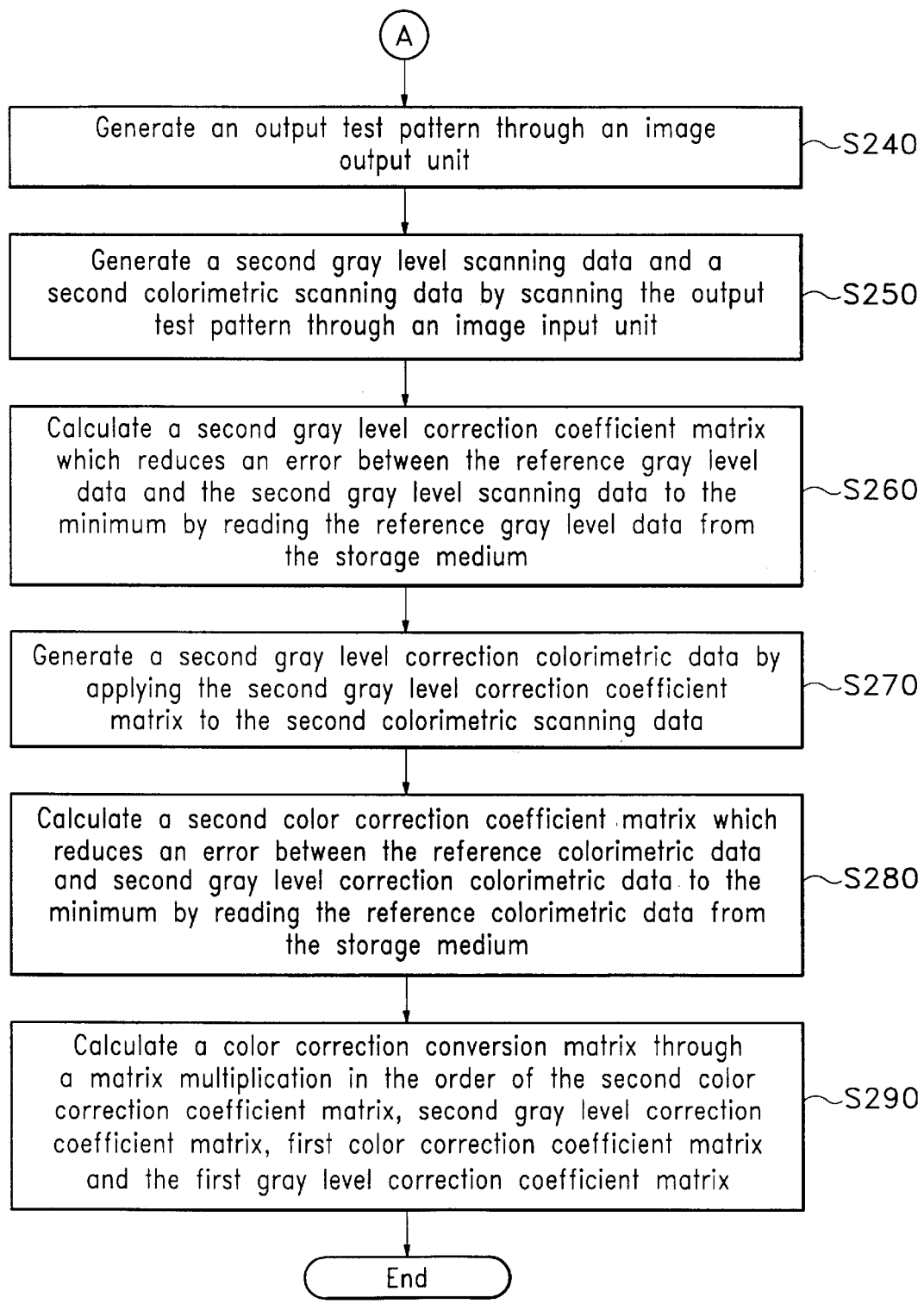

Hereinafter, another embodiment of the color correction method of the image system is explained with reference to FIGS. 14A and 14B.

As shown in the drawing, the color correction method of the image system which performs a color correction process through linear transformation, applying a color correction conversion matrix to input data obtained by scanning an input target document, includes the steps of: generating first scanning data of a first gray level scanning data and a first colorimetric scanning data by scanning an achromatic test pattern 11 and a chromatic test pattern 12 of a test pattern 10 (step S200); calculating a first gray level correction coefficient for calculating a first gray level correction coefficient matrix which reduces an error between a reference gray level data and the first gray level data to a minimum by scanning the reference gray level data from a storage medium which stores the reference gray level data previously measured from the achromatic test pattern 11 (step S210); performing a first gray level correction for acquiring the linearity of gray level characteristics regarding each color by generating a first gray level correction colorimetric data through linear transformation, applying the first gray level correction coefficient matrix to the first colorimetric scanning data (step S220); calculating a first correction coefficient for calculating a first color correction coefficient matrix which reduces an error between a reference colorimetric data and the first gray level correction colorimetric data to a minimum according to a certain color correction method by reading the reference colorimetric data from the storage medium which stores the reference colorimetric data previously measured from the chromatic test pattern 12 (step S230); generating an output test pattern including an achromatic output pattern and a chromatic output pattern by outputting a first color correction data generated through linear transformation, applying the first color correction coefficient matrix to the first gray level correction data through the color image output unit (step S240); generating second scanning data of a second gray level scanning data and a second colorimetric scanning data by scanning the achromatic output pattern and chromatic output pattern, repsectively, included in the output test pattern (step S250); calculating a second gray level correction coefficient for calculating a second gray level correction coefficient matrix which reduces an error between the reference gray level data and the second gray level scanning data to a minimum by reading the reference gray level data from the storage medium which stores the reference gray level data (step S260); performing a second gray level correction for acquiring the linearity of gray level characteristics regarding each color by generating a second gray level correction colorimetric data through linear transformation, applying the second gray level correction coefficient matrix to the second colorimetric scanning data (step S270); calculating a second color correction coefficient for calculating a second color correction coefficient matrix which reduces an error between the reference colorimetric data and second gray level correction colorimetric data according to the certain color correction method by reading the reference colorimetric data from the storage medium which stores the reference colorimetric data (step S280); and calculating a color correction conversion matrix through matrix multiplication in the order of the second color correction coefficient matrix, the second gray level correction coefficient matrix, the first color correction coefficient matrix and the first gray level correction coefficient matrix (step S290).

Here, the test pattern 10 includes the achromatic test pattern 11 in which the achromatic color is equally divided in certain positions according to the optical density and the chromatic test pattern 12, which uses the Macbeth color rendition chart in which a plurality of chromatic colors are equally divided in its other positions.

The certain color correction method is preferably one of the linear transformation method, the polynomial transformation method, and the 3-dimensional look-up table method.

Another embodiment of the color correction method of the image system according to the present invention is explained with reference to FIGS. 12 to 14.

First, at step S200, the first gray level scanning data and first colorimetric scanning data are formed by scanning the achromatic test pattern 11 and chromatic test pattern 12, respectively, of the test pattern 11 through the photoelectric conversion unit 20. Afterwards, at step S210, the gray level correction coefficient calculating unit 42 calculates the first gray level correction coefficient matrix which reduces an error between the reference gray level data and first gray level scanning data to a minimum by reading the reference gray level data from the reference gray level data storage unit 32a which stores the reference gray level data previously measured from the achromatic test pattern 11. At step S220, the linearity of gray level characteristics regarding each color is acquired by generating the first gray level correction colorimetric data through linear transformation, applying the first gray level correction coefficient matrix to the first colorimetric scanning data. To obtain the linearity of gray level characteristics is to obtain the linearity with the human visual characteristic by removing the gray level distortion characteristic which is generated by the color image input unit.

Afterwards, at step S230, the first color correction coefficient matrix is calculated, which reduces an error between the reference colorimetric data and the first gray level correction colorimetric data to a minimum by reading the reference colorimetric data from the reference colorimetric data storage unit 31 which stores the reference colorimetric data previously measured from the chromatic test pattern 12.

At step S240, the output test pattern 10a, including the achromatic output pattern 11a and the chromatic output pattern 12a, is formed by reading the reference gray level data and reference colorimetric data, respectively, from the reference data storage unit 31 through the color image output unit 110. At step S250, the second gray scanning data and second colorimetric scanning data are generated by scanning the achromatic output pattern 11a and chromatic output pattern 12a, respectively, of the output test pattern 10a through the photoelectric conversion unit 20.

At step S260, the gray level correction coefficient calculating unit 32 calculates the second gray level correction coefficient matrix which reduces an error between the reference gray level data and second gray level scanning data to a minimum by reading the reference gray level data from the reference gray level data storage unit 32 which stores the reference gray level data. At step S270, the linearity of gray level characteristics regarding each color is acquired by generating the second gray level correction colorimetric data through linear transformation, applying the second gray level correction coefficient matrix to the second colorimetric scanning data. To obtain the linearity of gray level characteristics is to obtain the linearity with the human visual characteristic by removing the gray level distortion characteristic which is generated by the color image output unit.

At step S280, the color correction coefficient calculating unit 33 calculates the second color correction coefficient matrix which reduces an error between the reference colorimetric data and second gray level correction colorimetric data to a minimum according to the certain color correction method by reading the reference colorimetric data from the reference colorimetric data storage unit 31 which stores the reference colorimetric data. At step S290, the color correction conversion matrix calculating unit (not illustrated) calculates the color correction conversion matrix through matrix multiplication in the order of the second color correction coefficient matrix, the second gray level correction coefficient matrix, the first color correction coefficient matrix and the first gray level correction coefficient matrix.

Here, the steps S230 and S280 of calculating the first and second coefficients, respectively, are explained in detail. Each of the steps is a process of obtaining the color correction coefficient matrix by substituting the relation between the data obtained by scanning the chromatic test pattern 12 and the gray level correction colorimetric data into the aforesaid formula (5) or (6), under the condition that gray level correction of the image system according to RGB channels is actually completed through the process of calculating the gray level correction coefficient matrix (i.e., under the state that the linearity of gray level characteristics of RGB colors of the image system is acquired). Since the process of steps S230 and S280 is similar to that of step S140, repeated explanation is omitted.

Referring to FIGS. 13A and 13B, the entire concept of another embodiment of the color correction apparatus according to the present invention is explained more properly.

According to another embodiment of the color correction apparatus of the image system, when the output test pattern outputted through the color image output unit 110 is scanned through the color image input unit 200, a feedback loop regarding the input/output is formed. Accordingly, after performing the color correction once, a more accurate color correction process can be performed by repeating the operation of applying the color-corrected output test pattern outputted from the color image output unit 110 to the color image input unit 200 again.

By repeatedly performing the process of the present invention which is performed in the order of steps S200, S210, S220, S230, S240, S250, S260, S270, S280 and S290, more accurate color correction conversion matrix is calculated, thereby maximizing the efficiency of the present invention.

In the above preferred embodiments of the present invention, it is preferable to perform device-independent color correction by outputting the output obtained by performing the color correction process regarding the output of the photoelectric conversion unit 20 after converting it into the XYZ color coordinate system of CIE, which is the device-independent color coordinate system. Preferably, the color image output unit receives the results, and then outputs them after converting them into the CMYK color coordinate system.

When the image input unit is used singly, or when both the color image input unit and color image output unit are used, various situations can be encountered according to the settlement of the operating type. In addition, a new unit other than the color image input unit and color image output unit can be added. The color distortion characteristic generated by the added devices can be removed easily in the color correction process according to the present invention.

In the present invention, units for performing input/output are explained as examples. It is also possible to use other color image input/output units and color processing units, (i.e., a monitor, printer, communication unit and a camera are easily applied to the present invention).

As described above, according to the color correction apparatus and method of the image system according to the present invention, it is possible to perform the color correction process without regard to the spectrum characteristic of the spectral optical system, age-based variation and individual variation of the light quantity, the gray level correction which linearizes the output of the image sensor according to the 3-wavelength bandwidth. The reference colorimetric data previously measured from the test pattern for measuring the color correction is stored in a storage medium, and the color correction process is performed so that the error between the scanning data obtained by scanning the measuring test pattern and the reference colorimetric data can be a minimum. Accordingly, color correction can be performed without using an optical densitometer or a colorimeter, and the operation for correcting the color can be performed without knowledge of the color coordinate system or color signal.

With the input/output feed loop as in the present invention, it is unnecessary to perform a separate external operation for calculating the color correction coefficient. Since the operation process is also performed inside of the image system, it is possible to realize an image system having a color correction performance which is simple and efficient.

While color correction is performed at any time in the related arts to adaptively process the age-based variation of the image caused by variation in the operation condition or environment, color correction according to the present invention is performed by only scanning the prescribed test pattern through the color image input unit.

In addition, since device-independent color correction can be performed, efficiency is maximized when the image systems are connected mutually through communication networks.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A color correction apparatus of an image system including a photoelectric conversion unit which radiates an illuminating light having a certain light emitting spectrum to an object and outputs spectral information regarding each of a plurality of colors reflected from said object after converting the spectral information into electrical signals, said apparatus comprising:

first reference data storage means for storing reference gray level data and reference colorimetric data measured from an achromatic test pattern and a chromatic test pattern, respectively, of a preset test pattern by accumulating the data in a database system;

correction coefficient calculating means for calculating a color correction coefficient matrix which reduces an error between colorimetric scanning data and said reference colorimetric data to minimum after receiving said colorimetric scanning data obtained by scanning said chromatic test pattern through said photoelectric conversion unit; and color correction means for receiving said color correction coefficient matrix from said correction coefficient calculating means, and for performing a linear transformation applying said color correction coefficient matrix to an output of said photoelectric conversion unit and then outputting a result after converting into a certain color coordinate system;

wherein an achromatic color is divided equally on said achromatic test pattern at certain positions according to optical density, and wherein said chromatic test pattern uses a Macbeth color rendition chair on which a plurality of chromatic colors are divided equally at other positions.

2. The apparatus of claim 1, wherein said correction coefficient calculating means further comprises a gray level correction coefficient calculating unit for calculating a gray level correction coefficient matrix which reduces an error between gray level scanning data and reference gray level data to a minimum after receiving said gray level scanning data obtained by scanning said achromatic test pattern through said photoelectric conversion unit, said color correction means further comprising a gray level correction processing unit which receives said color correction coefficient matrix from said gray level correction coefficient calculating unit, performs the linear transformation applying said gray level correction coefficient matrix to the output of said photoelectric conversion unit, and then applies the output to said color correction processing unit.

3. The apparatus of claim 2, wherein said correction coefficient calculating means further comprises:

a color correction conversion matrix calculating unit which calculates a color correction conversion matrix through a matrix multiplication in an order of said gray level correction coefficient matrix and said color correction coefficient matrix; and a color correction unit which performs the linear transformation applying said color correction conversion matrix to the output of said photoelectric conversion unit, and then outputs the output of said photoelectric conversion unit after converting into a certain color coordinate system.

4. The apparatus of claim 1, further comprising color image output means for reading said reference gray level data and reference colorimetric data from said first reference data storage means, and for outputting an output test pattern including an achromatic output pattern and a chromatic output pattern.

5. The apparatus of claim 1, further comprising a reference data storage unit and color image output means for reading said reference gray level data and reference colorimetric data from said reference data storage unit after locating said reference data storage unit which is a storage medium similar to said reference data storage means, and wherein said image output means outputs an output test pattern including an achromatic output pattern and a chromatic output pattern.

6. The apparatus of claim 1, wherein said reference data storage means comprises:
   a reference gray level data storage unit which stores said reference gray level data measured through an optical densitometer from said achromatic test pattern by accumulating the reference gray level data in the database system; and
   a reference colorimetric data storage unit which stores said reference colorimetric data measured through a colorimeter from said chromatic test pattern by accumulating the reference colorimetric data in the database system.

7. The apparatus of claim 1, wherein said correction coefficient calculation means employs a certain color correction method which is one of a linear transformation method, a polynomial transformation method and a 3-dimensional look-up table method.

8. The apparatus of claim 1, wherein said certain color coordinate system is an XYZ color coordinate system of the Commission International de l'Eclairage (CIE).

9. A color correction method of an image system which performs a color correction process through a linear transformation applying a color correction conversion matrix to an input data obtained by scanning an input target document, said method comprising the steps of:
   generating first scanning data of a first gray level scanning data and a first colorimetric scanning data by scanning an achromatic test pattern and a chromatic test pattern, respectively, of a preset test pattern;
   calculating a first gray level correction coefficient for calculating a first gray level correction coefficient matrix which reduces an error between a reference gray level data and said first gray level scanning data to a minimum by reading said reference gray level data from a storage medium which stores said reference gray data previously measured from said achromatic test pattern;
   performing a first gray level correction for acquiring a linearity of gray level characteristics regarding each of a plurality of colors by generating first gray level correction colorimetric data through a linear transformation applying said first gray level correction coefficient matrix to said first colorimetric scanning data;
   calculating a first color correction coefficient for calculating a first correction coefficient matrix which reduces an error between reference colorimetric data and said first gray level correction colorimetric data to a minimum according to a certain color correction method by reading said reference colorimetric data from the storage medium which stores said reference colorimetric data previously measured from said chromatic test pattern; and
   calculating a first color correction conversion matrix through a matrix multiplication in the order of said first gray level correction coefficient matrix and said first color correction coefficient matrix, and setting said first color correction conversion matrix as said color correction conversion matrix;
   wherein, on said achromatic test pattern, an achromatic color is divided equally at certain positions according to optical density; and
   wherein said chromatic test pattern uses a Macbeth color rendition chart on which a plurality of chromatic colors is divided equally at other positions.

10. The method of claim 9, further comprising the steps of:
    generating an output test pattern including an achromatic output pattern and a chromatic output pattern by outputting first color correction data generated by the linear transformation applying said first color correction conversion matrix to said first gray level scanning data and first colorimetric scanning data through a color image output unit;
    generating second scanning data of a second gray level scanning data and a second colorimetric scanning data by scanning said achromatic output pattern and chromatic output pattern, respectively, included in said output test pattern;
    calculating a second gray level correction coefficient for calculating a second gray level correction coefficient matrix which reduces an error between said reference gray level data and second gray level scanning data to a minimum by reading said reference gray level data from the storage medium which stores said reference gray level data;
    performing a second gray level correction for acquiring a linearity of gray level characteristics regarding each color by generating second gray level correction colorimetric data through the linear transformation applying said second gray level correction coefficient matrix to said second colorimetric scanning data;
    calculating a second color correction coefficient for calculating a second color correction coefficient matrix which reduces an error between said reference colorimetric data and second gray level correction colorimetric data to a minimum according to a certain color correction method by reading said reference colorimetric data from the storage medium which stores said reference colorimetric data; and
    calculating a second color correction conversion matrix through the matrix multiplication in the order of said second color correction coefficient matrix, said second gray level correction coefficient matrix and said first color correction conversion matrix, and setting said second color correction conversion matrix as said color correction conversion matrix.

11. The method of claim 10, wherein said certain color correction method is one of a linear transformation method, a polynomial transformation method and a 3-dimensional look-up table method.

12. The method of claim 10, wherein the data color-corrected through the linear transformation applying said color correction conversion matrix to said input data are outputted after converting into an XYZ color coordinate system of the Commission International de l'Eclairage (CIE).

13. The method of claim 9, wherein said certain color correction method is one of a linear transformation method, a polynomial transformation method and a 3-dimensional look-up table method.

14. A color correction method of an image system which performs a color correction process through a linear transformation applying a color correction conversion matrix to an input data obtained by scanning an input target document, said method comprising the steps of:
    generating an output test pattern including an achromatic output pattern and a chromatic output pattern by reading reference gray level data and reference colorimetric data previously measured from an achromatic test pattern and a chromatic test pattern, respectively, of a preset test pattern from a storage medium, and outputting said reference gray level data and reference colorimetric data through a color image output unit;

generating scanning data of a gray level scanning data and a colorimetric scanning data by scanning said achromatic output pattern and said chromatic output pattern, respectively, included in said output test pattern through a color image input unit;

calculating a gray level correction coefficient for calculating a gray level correction coefficient matrix which reduces an error between said reference gray level data and gray level scanning data to a minimum by reading said reference gray level data from the storage medium which stores said reference gray level data;

performing a gray level correction for acquiring a linearity of gray level characteristics regarding each of a plurality of colors by generating gray level correction colorimetric data through the linear transformation applying said gray level correction coefficient matrix to said colorimetric scanning data;

calculating a color correction coefficient for calculating a color correction coefficient matrix which reduces an error between said reference colorimetric data and gray level correction colorimetric data to a minimum according to a certain color correction method by reading said reference colorimetric data from the storage medium which stores said reference colorimetric data; and calculating a color correction conversion matrix through a matrix multiplication in the order of said color correction coefficient matrix and said gray level correction coefficient matrix;

wherein, on said achromatic test pattern, an achromatic color is divided equally at certain positions according to optical density; and wherein said chromatic test pattern uses a Macbeth color rendition chart on which a plurality of chromatic colors is divided equally at other positions.

15. The method of claim 14, wherein said certain color correction method is one of a linear transformation method, a polynomial transformation method and a 3-dimensional look-up table method.

16. The method of claim 14, wherein the data color-corrected through the linear transformation applying said color correction conversion matrix to said input data are outputted after converting into an XYZ color coordinate system of the Commission International de l'Eclairage (CIE).

17. A color correction apparatus of an image system including a photoelectric conversion unit which radiates an illuminating light having a certain light emitting spectrum to an object and outputs spectral information regarding each of a plurality of colors reflected from said object after converting the spectral information into electrical signals, said apparatus comprising:

first reference data storage means for storing reference gray level data and reference colorimetric data measured from an achromatic test pattern and a chromatic test pattern, respectively, of a preset test pattern by accumulating the data in a database system;

correction coefficient calculating means for calculating a color correction coefficient matrix which reduces an error between colorimetric scanning data and said reference colorimetric data to a minimum after receiving said colorimetric scanning data obtained by scanning said chromatic test pattern through said photoelectric conversion unit; and color correction means for receiving said color correction coefficient matrix from said correction coefficient calculating means, and for performing a linear transformation applying said color correction coefficient matrix to an output of said photoelectric conversion unit and then outputting a result after converting into a certain color coordinate system;

wherein an achromatic color is divided equally on said achromatic test pattern at certain positions according to optical density; and wherein said chromatic test pattern uses a Macbeth color rendition chart on which a plurality of chromatic colors are divided equally at other positions.

18. A color correction method of an image system which performs a color correction process through a linear transformation applying a color correction conversion matrix to an input data obtained by scanning an input target document, said method comprising the steps of:

generating first scanning data of a first gray level scanning data and a first colorimetric scanning data by scanning an achromatic test pattern and a chromatic test pattern, respectively, of a preset test pattern;

calculating a first gray level correction coefficient for calculating a first gray level correction coefficient matrix which reduces an error between a reference gray level data and said first gray level scanning data to a minimum by reading said reference gray level data from a storage medium which stores said reference gray data previously measured from said achromatic test pattern;

performing a first gray level correction for acquiring a linearity of gray level characteristics regarding each of a plurality of colors by generating first gray level correction colorimetric data through a linear transformation applying said first gray level correction coefficient matrix to said first colorimetric scanning data;

calculating a first color correction coefficient for calculating a first correction coefficient matrix which reduces an error between reference colorimetric data and said first gray level correction colorimetric data to a minimum according to a certain color correction method by reading said reference colorimetric data from the storage medium which stores said reference colorimetric data previously measured from said chromatic test pattern; and calculating a first color correction conversion matrix through a matrix multiplication in the order of said first gray level correction coefficient matrix and said first color correction coefficient matrix, and setting said first color correction conversion matrix as said color correction conversion matrix;

said method further comprising the step of generating an output test pattern including an achromatic output pattern and a chromatic output pattern by outputting first color correction data generated by the linear transformation applying said first color correction conversion matrix to said first gray level scanning data and first colorimetric scanning data through a color image output unit;

wherein said test pattern includes said achromatic test pattern on which an achromatic color is divided equally at certain positions according to optical density; and wherein said chromatic test pattern uses a Macbeth color rendition chart on which a plurality of chromatic colors is divided equally at other positions.

19. The method of claim 18, wherein said certain color correction method is one of a linear transformation method, a polynomial transformation method and a 3-dimensional look-up table method.

\* \* \* \* \*